(12) United States Patent
Bouzas et al.

(10) Patent No.: US 7,502,771 B2
(45) Date of Patent: Mar. 10, 2009

(54) METHOD, SYSTEM AND APPARATUS FOR GENERATING DECISION TREES INTEGRATED WITH PETRO-TECHNICAL WORKFLOWS

(75) Inventors: Horacio R. Bouzas, London (GB); Jim Brady, La Jolla, CA (US); Daniel Neisch, Round Rock, TX (US); Jason McVean, Calgary (CA); Lev Virine, Calgary (CA)

(73) Assignee: Schlumberger Technology Corporation, Houston, TX (US)

( * ) Notice: Subject to any disclaimer, the term of this patent is extended or adjusted under 35 U.S.C. 154(b) by 125 days.

(21) Appl. No.: 11/432,121

(22) Filed: May 11, 2006

(65) Prior Publication Data

US 2007/0282774 A1 Dec. 6, 2007

(51) Int. Cl.
*G06F 17/00* (2006.01)
*G06N 5/00* (2006.01)
(52) U.S. Cl. ............................. 706/45; 700/30; 700/44; 705/7; 707/100
(58) Field of Classification Search ........................ None
See application file for complete search history.

(56) References Cited

U.S. PATENT DOCUMENTS

| 2004/0199484 A1* | 10/2004 | Smith et al. ..................... 706/52 |
| 2005/0039107 A1* | 2/2005 | Hander et al. ................ 715/500 |
| 2006/0153005 A1* | 7/2006 | Herwanger et al. ........... 367/38 |

* cited by examiner

*Primary Examiner*—David R Vincent
*Assistant Examiner*—Kalpana Bharadwaj
(74) *Attorney, Agent, or Firm*—Bryan P. Galloway; Osha Liang LLP; John Bouchard

(57) ABSTRACT

A method of generating a decision tree for a seismic to simulation workflow, including: identifying a plurality of elements of the seismic to simulation workflow; receiving a plurality of modeling scenarios for each of the plurality of elements, where each of the plurality of modeling scenarios is associated with a realization of the seismic to simulation workflow; receiving a plurality of probabilities for the plurality of modeling scenarios; and generating a decision tree comprising a plurality of nodes and a plurality of branches in response to said plurality of modeling scenarios, where each level of the decision tree is associated with one of the plurality of elements, where the plurality of nodes are associated with the plurality of modeling scenarios, and where the plurality of branches are based on the plurality of probabilities.

20 Claims, 43 Drawing Sheets

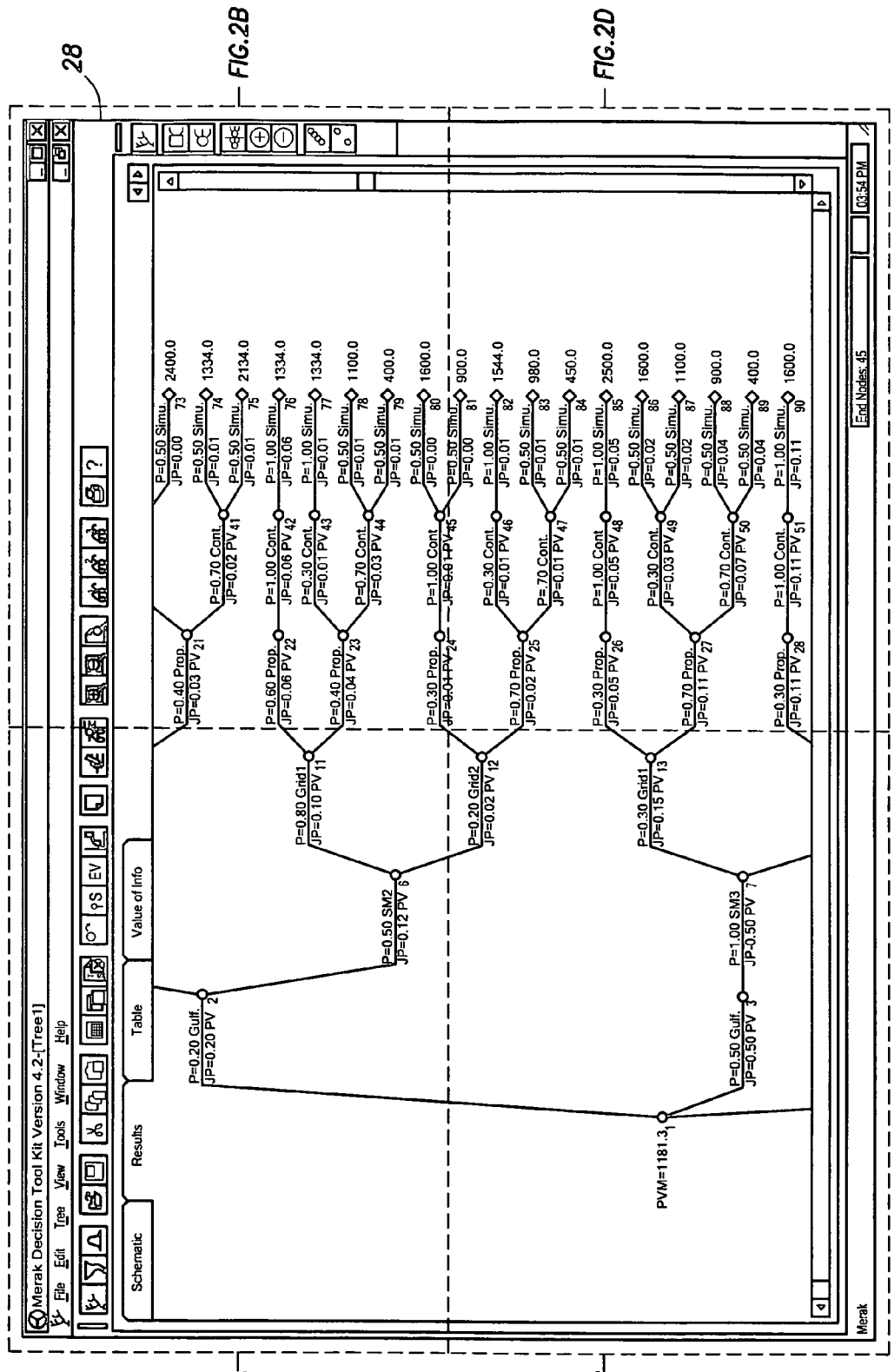

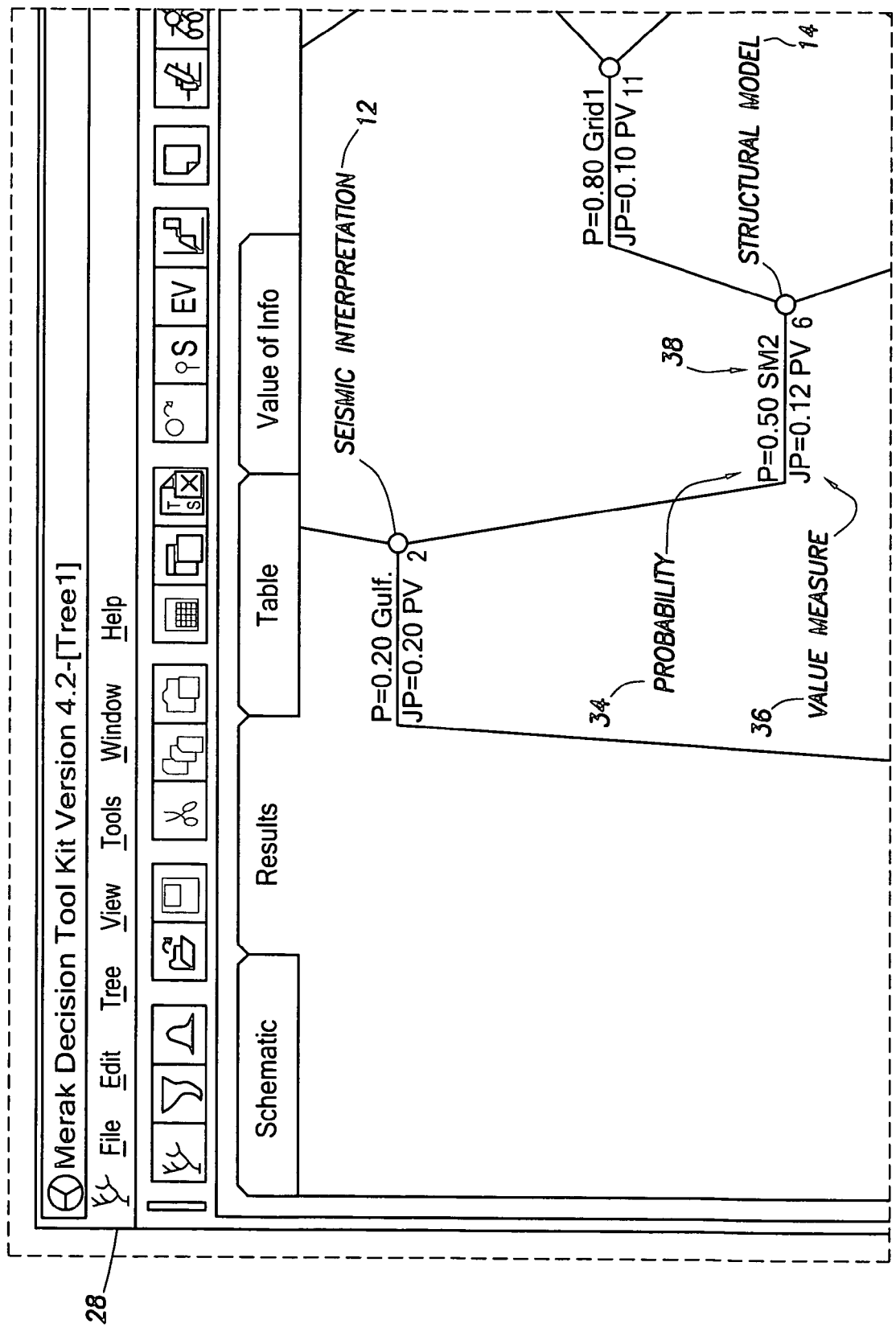

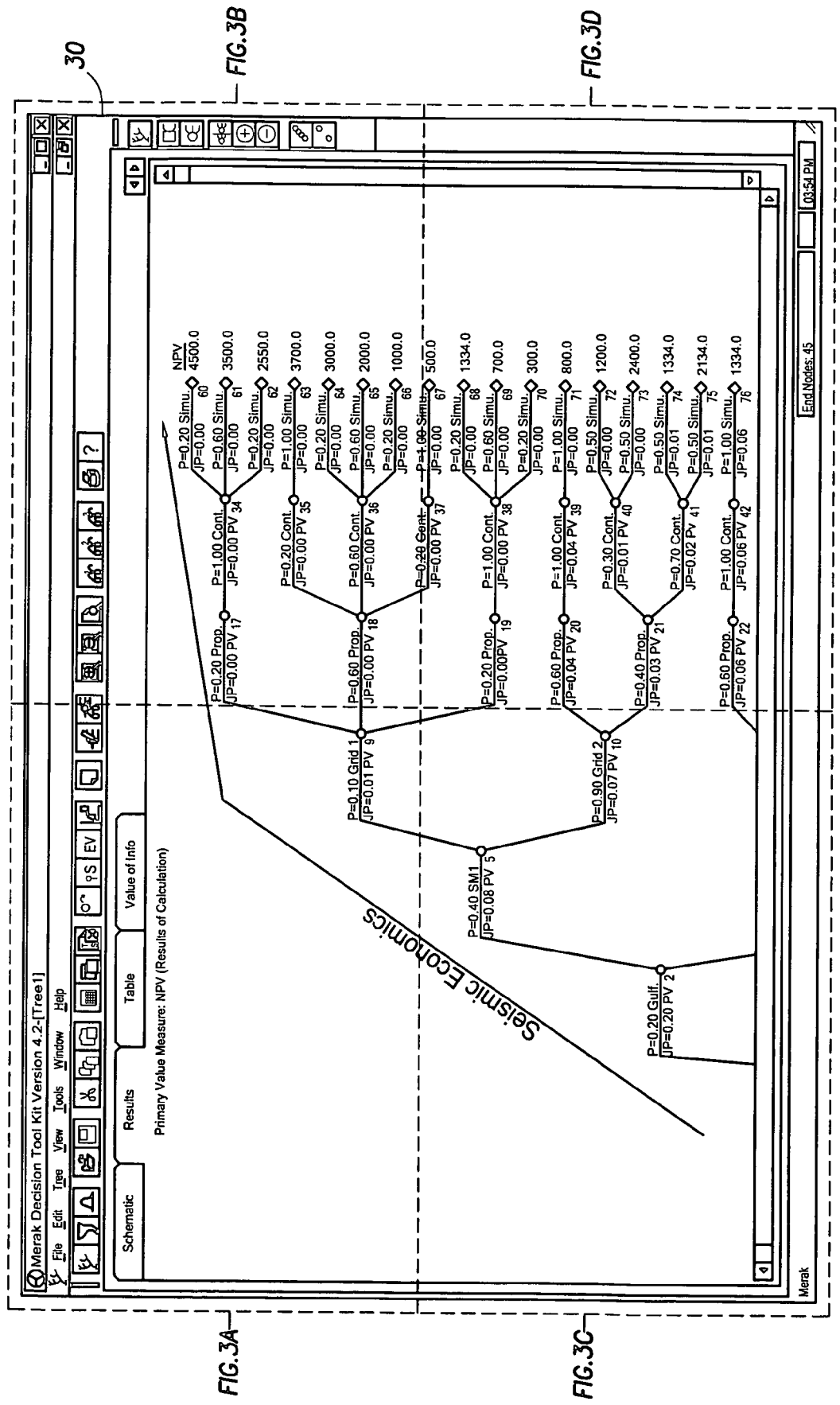

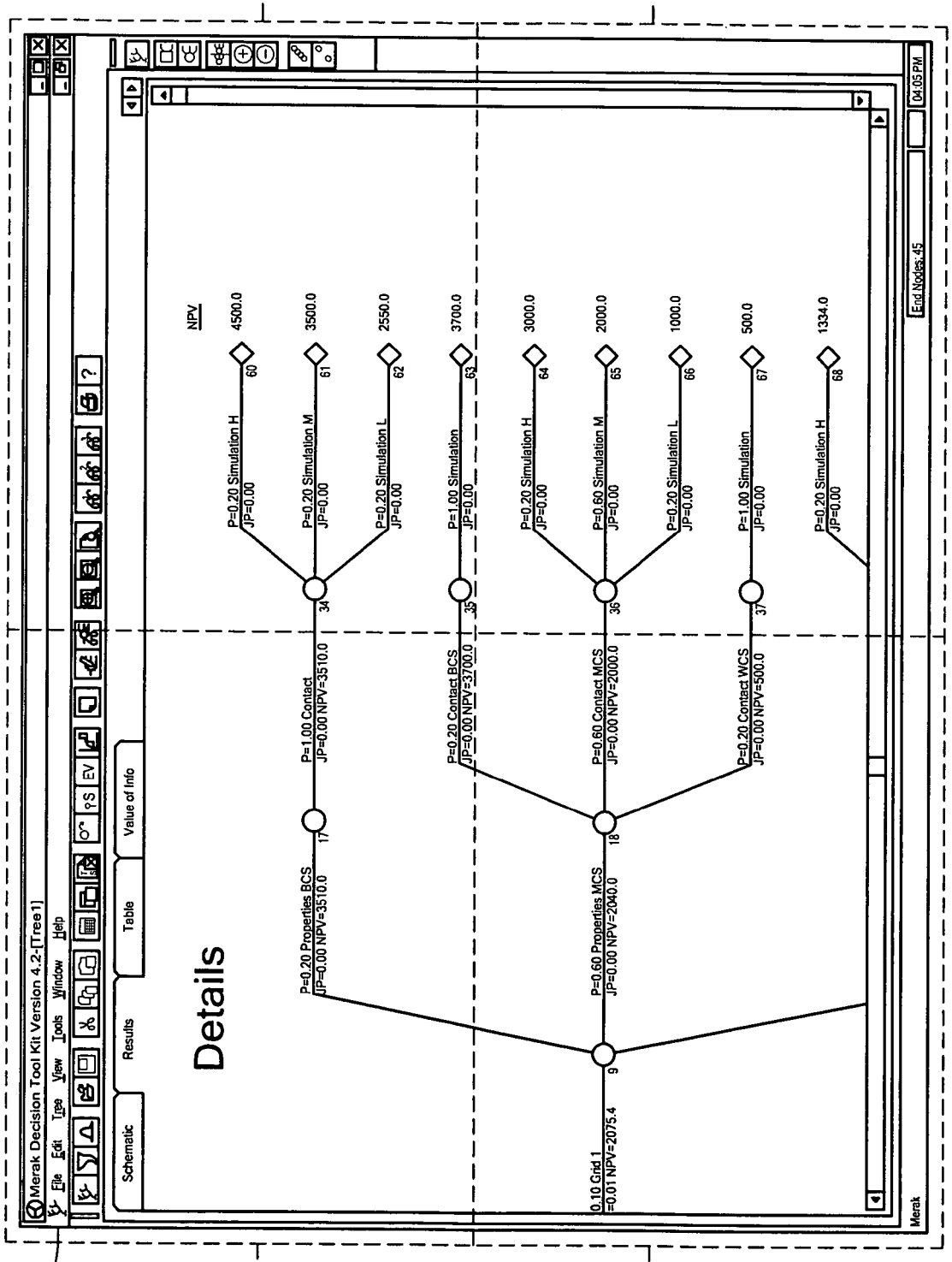

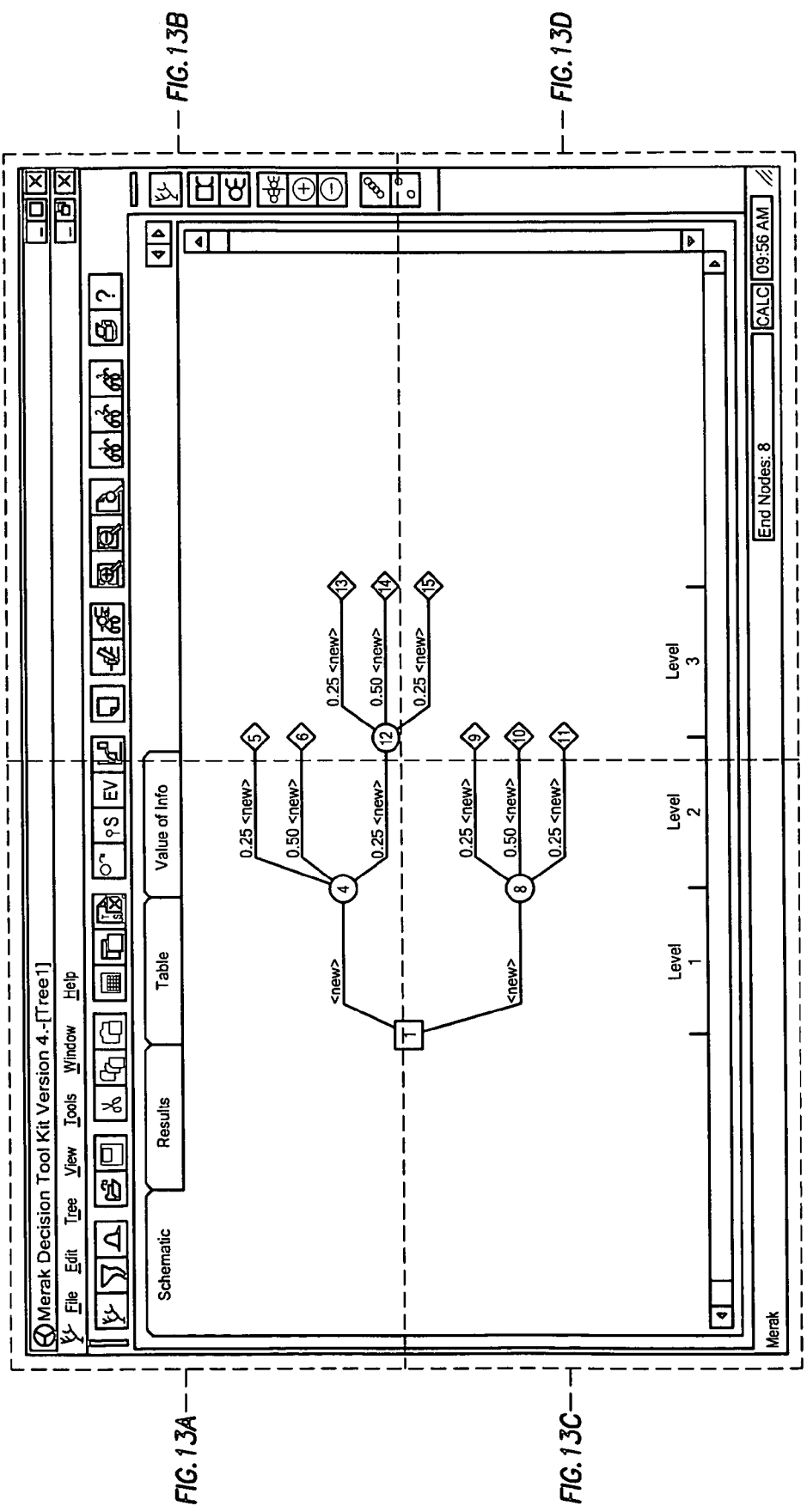

| | Branches | | | | Case | |
|---|---|---|---|---|---|---|
| Branches | Prob. | Reward | Inheritance | | Case | Factor |
| High | 0.25 | 0 | Same | | Sample Decision Tree Case-U.S. | 1 |
| Base | 0.5 | 0 | Same | | Sample Decision Tree Case-U.S. | 1 |
| Low | 0.25 | 0 | Same ▷ | Same / Repl. / Cons. | Sample Decision Tree Case-U.S. | 1 |

FIG. 14

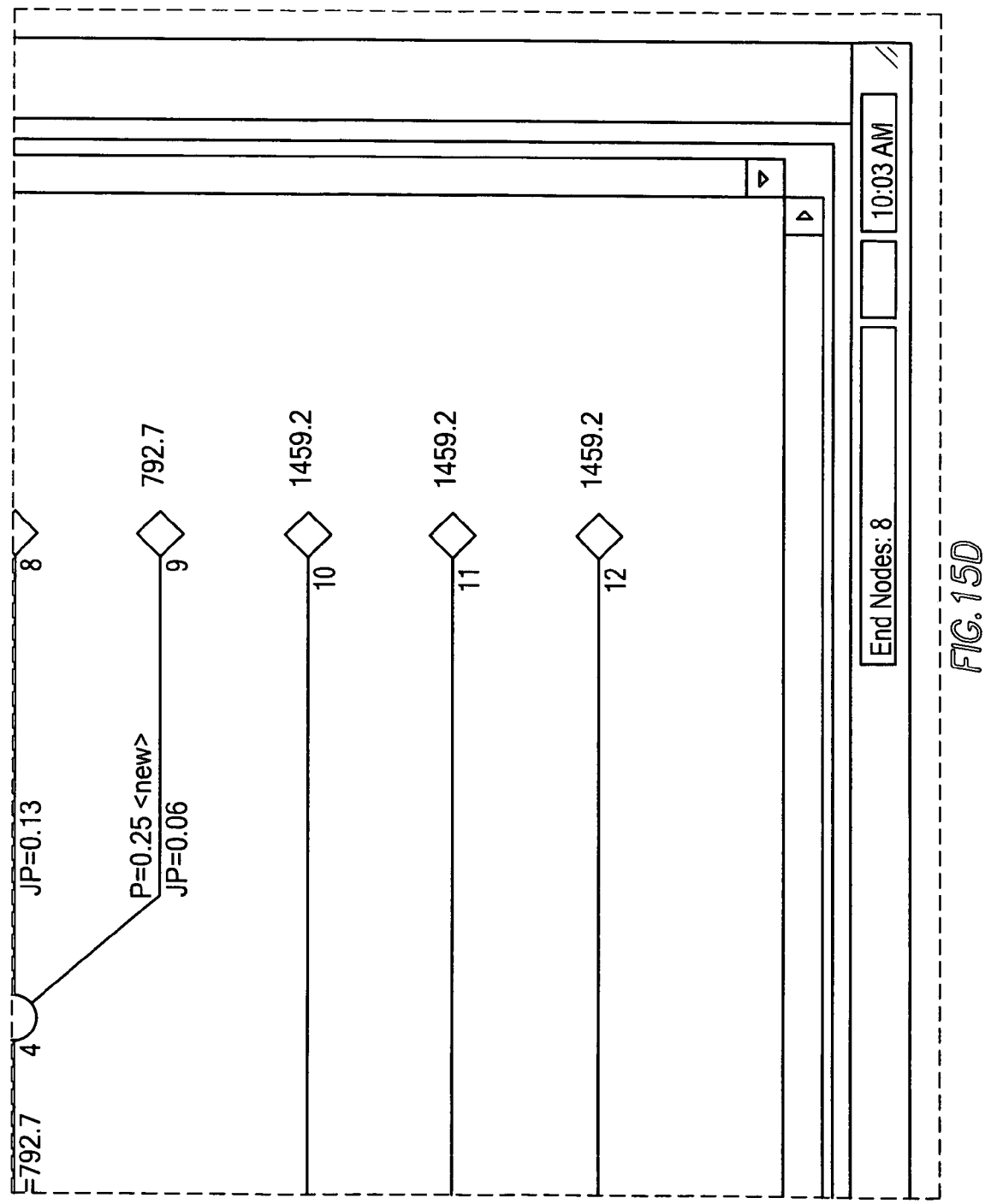

METHOD, SYSTEM AND APPARATUS FOR GENERATING DECISION TREES INTEGRATED WITH PETRO-TECHNICAL WORKFLOWS

BACKGROUND

The subject matter disclosed in this specification relates to a method, and its associated system and program storage device and computer program, adapted for generating Decision Trees that are tightly integrated with petro-technical workflows, the Decision Trees enabling a modeler or interpreter to better understand Decisions made within the workflows and to properly evaluate the economic value of Prospects in a real time manner.

Seismic to simulation workflows, and multiple realizations of them, can be visualized in a clearer manner by using 'Decision Trees', the 'Decision Trees' showing: decisions made along the way in such workflows, and an expected value of the prospects in such workflows. The 'Decision Trees' can be updated, new decisions or possibilities can be added to the 'Decision Trees', and the associated workflow can be rerun in order to obtain a new expected monetary value of the prospect.

SUMMARY

One aspect of the 'Decision Tree Generation software' described in this specification involves a method of generating a decision tree, comprising: receiving a plurality of modeling scenarios representing a corresponding plurality of workflows; and generating a decision tree in response to the plurality of modeling scenarios.

Another aspect of the 'Decision Tree Generation software' described in this specification involves a program storage device readable by a machine tangibly embodying a program of instructions executable by the machine to perform method steps for generating a decision tree, the method steps comprising: receiving a plurality of modeling scenarios representing a corresponding plurality of workflows; and generating a decision tree in response to the plurality of modeling scenarios.

Another aspect of the 'Decision Tree Generation software' described in this specification involves a system adapted for generating a decision tree, comprising: first apparatus adapted for receiving a plurality of modeling scenarios representing a corresponding plurality of workflows; and second apparatus adapted for generating a decision tree in response to the plurality of modeling scenarios.

Another aspect of the 'Decision Tree Generation software' described in this specification involves a computer program adapted to be executed by a processor, the computer program, when executed by the processor, conducting a process for generating a decision tree, the process comprising: receiving a plurality of modeling scenarios representing a corresponding plurality of workflows; and generating a decision tree in response to the plurality of modeling scenarios.

Further scope of applicability will become apparent from the detailed description presented hereinafter. It should be understood, however, that the detailed description and the specific examples set forth below are given by way of illustration only, since various changes and modifications within the spirit and scope of the of the 'Decision Tree Generation software', as described and claimed in this specification, will become obvious to one skilled in the art from a reading of the following detailed description.

BRIEF DESCRIPTION OF THE DRAWINGS

A full understanding will be obtained from the detailed description presented hereinbelow, and the accompanying drawings which are given by way of illustration only and are not intended to be limitative to any extent, and wherein:

FIGS. 2, 2A, 2B, 2C, 2D, 3, 3A, 3B, 3C, 3D, 4, 4A, 4B, 4C, and 4D illustrate examples of 'Decision Trees' which are generated from the 'seismic to simulation workflow' of FIG. 1;

FIGS. 10 through 20 illustrate the 'windows' or 'dialogs' that are being displayed on the 'display screen' of the computer system of FIGS. 5 and 9 in response to the execution of the 'Decision Tree Generation Software' of FIG. 5 by the processor of the computer system of FIG. 5, the 'windows' or 'dialogs' being used (by a user) to generate one or more 'Decision Trees' which are adapted to show: (1) the decisions made along the way within such petro-technical workflows, and (2) any expected values of any prospects within such workflows.

DESCRIPTION

Figure 1:
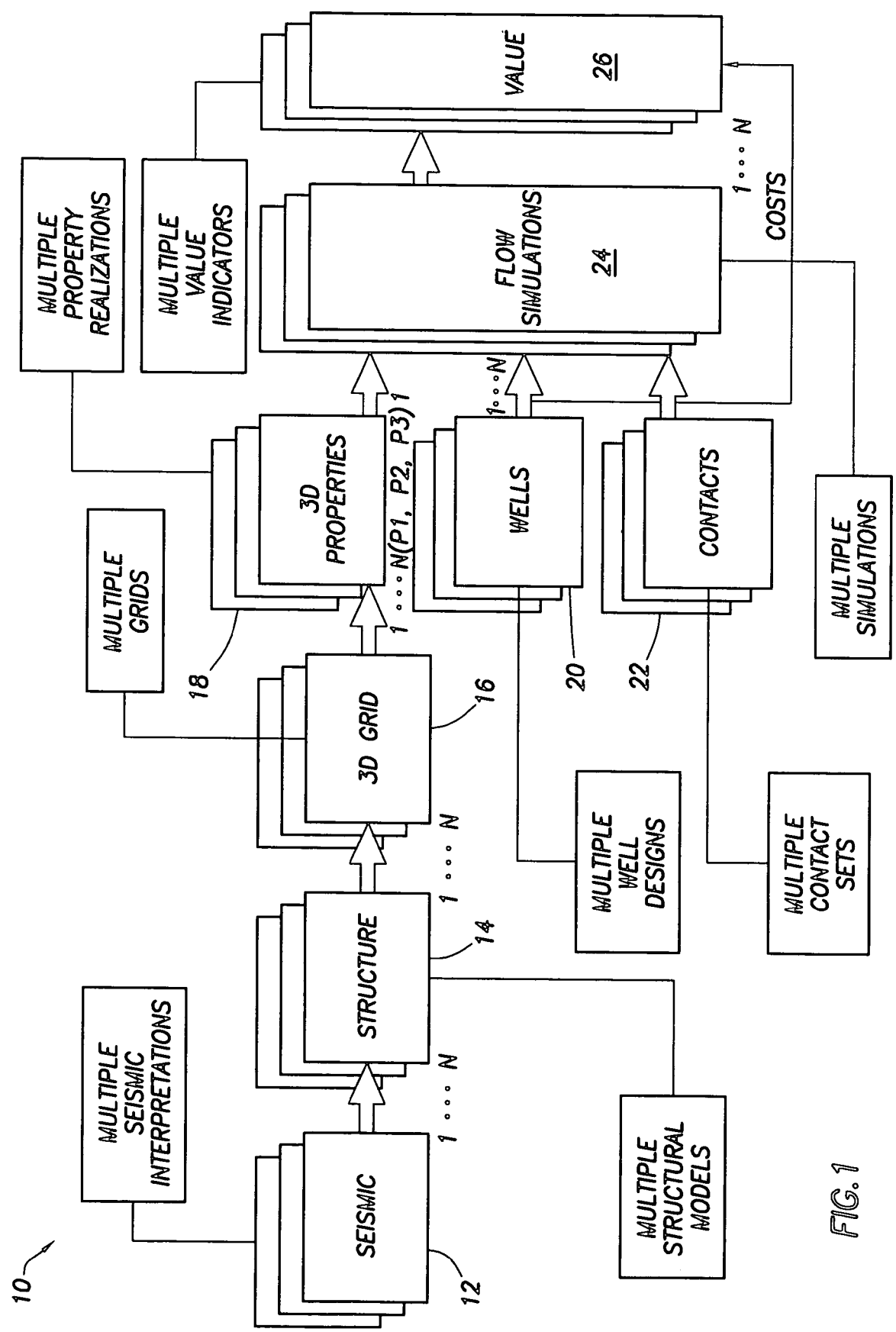
FIG. 1 illustrates a simplified example of a typical 'seismic to simulation workflow' where it is evident that the magnitude and complexity of the data used and created is significant.

Seismic interpretation to Reservoir Simulation workflows can get very complex, both in terms of the amount of data manipulated and the decisions made along the way. Typically, in existing applications, it is difficult to visualize the decision path along these workflows. Also, as modules start computing uncertainty and probabilities, the task of understanding the implications of decisions made at different stages of the workflow can be very difficult. Decision trees, which are generated directly and automatically from these workflows, can be very useful to represent, in a simple and graphic manner: (1) the 'decisions made', (2) the 'probabilities', and (3) the 'estimated value of those decisions'.

Decision trees can also be useful to present a clearer picture of alternative interpretations, stochastic property realizations, contacts, simulations, planned and drilled wells, and costs. Also, Decision Trees can show value for a project. For example, considering all alternative options and scenarios, Decision Trees can show Net Present Value (NPV) or other economic indicators at the leaf level, or an estimated Expected Value (EV) of a prospect, or the Expected Value (EV) of the entire prospect.

When using a Decision Tree, the various options being considered by a modeler or interpreter will become clearer. The Decision Tree will provide a better understanding of how different scenarios can affect Expected Value (EV) thereby allowing for the elimination of low probability and/or low profitability options and providing immediate results in prospect Expected Value (EV). Decision trees can also aid in managing probabilities, since probabilities can be set within the Decision Tree (or at the workflow step), and, as a result, such probabilities can be easily visualized within the Decision Tree itself. The user can also: create new scenarios within the 'Decision Tree plug-in', or re-compute existing scenarios by communicating back to the calling application.

As a result, by using 'Decision Trees', 'seismic to simulation workflows' (and multiple realizations of them) can be visualized in a clearer manner because 'Decision Trees' show: (1) decisions made along the way within such 'seismic to simulation workflows', and (2) any expected values (EV) of any prospects within such workflows. In addition, the 'Decision Trees' can be updated since new decisions or possibilities can be added to the 'Decision Trees'. When the 'Decision Tree' is updated, the associated 'seismic to simulation workflow' can then be 'rerun' in order to obtain a new Expected Monetary Value of the prospects.

A 'Decision Tree plug-in' disclosed in this specification stores a novel Decision Tree Generation Software which, when executed by a processor of a computer system, will generate a Decision Tree that illustrates and represents the aforementioned 'decisions made' and the 'probabilities' and the 'estimated value of those decisions'. However, in addition, the 'Decision Tree plug-in' disclosed in this specification can also compute the Expected Value (EV) of a scenario, and it can generate various economic indicators using probabilities set either at the application level or at the plug-in level.

Referring to FIG. 1, a simplified example of a typical 'seismic to simulation workflow' 10 is illustrated where it is evident that the magnitude and/or complexity of the data used and created by the workflow is significant. The workflow 10 actually includes a 'multiple number of workflows', where 'each workflow' of the 'multiple number of workflows' represents a 'single modeling scenario' and 'each workflow' includes the following 'elements' as shown in FIG. 1: 'seismic' 12, 'structure' 14, '3D grid' 16, '3D properties' 18, 'wells' 20, 'contacts' 22, 'flow simulations' 24, and 'value' 26. Note that a 'modeling scenario generator' 56 shown in FIGS. 6 and 7 will generate a plurality of such 'modeling scenarios', and such 'modeling scenarios' will be received by the 'Decision Tree Generator' 50 for the purpose of generating a Decision Tree 58 (to be discussed later in this specification).

In FIG. 1, the 'seismic to simulation workflow' 10 includes the following 'elements': 'seismic' 12 representing multiple seismic interpretations, 'structure' 14 representing multiple structural models, '3D grid' 16 representing multiple grids, '3D properties' 18 representing multiple property realizations, 'wells' 20 representing multiple wellbores, 'contacts' 22 representing multiple contact sets, 'Flow Simulations' 24 representing multiple simulations, and 'value' 26 representing multiple value indicators. In FIG. 1, recalling that each 'workflow' of the 'multiple number of workflows' of the 'seismic simulation workflow' 10 represents a 'single modeling scenario', it is evident that the 'seismic simulation workflow' 10 of FIG. 1 includes the following plurality of workflows, as follows: (1) 'workflow 1' representing 'modeling scenario 1' including 'seismic 1' 12 and 'structure 1' 14 and '3D grid 1' 16 and '3D properties 1' 18 and 'wells 1' 20 and 'contacts 1' 22 and 'flow simulations 1' 24 and 'value 1' 26; (2) 'workflow 2' representing 'modeling scenario 2' including 'seismic 2' 12 and 'structure 2' 14 and '3D grid 2' 16 and '3D properties 2' 18 and 'wells 2' 20 and 'contacts 2' 22 and 'flow simulations 2' 24 and 'value 2' 26; (3) 'workflow 3' representing 'modeling scenario 3' including 'seismic 3' 12 and 'structure 3' 14 and '3D grid 3' 16 and '3D properties 3' 18 and 'wells 3' 20 and 'contacts 3' 22 and 'flow simulations 3' 24 and 'value 3' 26; . . . ; and (n) 'workflow n' representing 'modeling scenario n' including 'seismic n' 12 and 'structure n' 14 and '3D grid n' 16 and '3D properties n' 18 and 'wells n' 20 and 'contacts n' 22 and 'flow simulations n' 24 and 'value n' 26.

As noted earlier, 'Decision Trees' show decisions made along the way within the 'seismic to simulation workflows', and 'Decision Trees' also show any expected values (EV) of any prospects within such workflows. Recalling the above referenced 'elements' of the workflow of FIG. 1, and recalling that 'Decision Trees' show 'decisions' made along the way within the 'workflow' of FIG. 1, let us now locate the above referenced 'elements' of the workflow of FIG. 1 within the Decision Trees of FIGS. 2, 3, and 4.

Figure 2B:
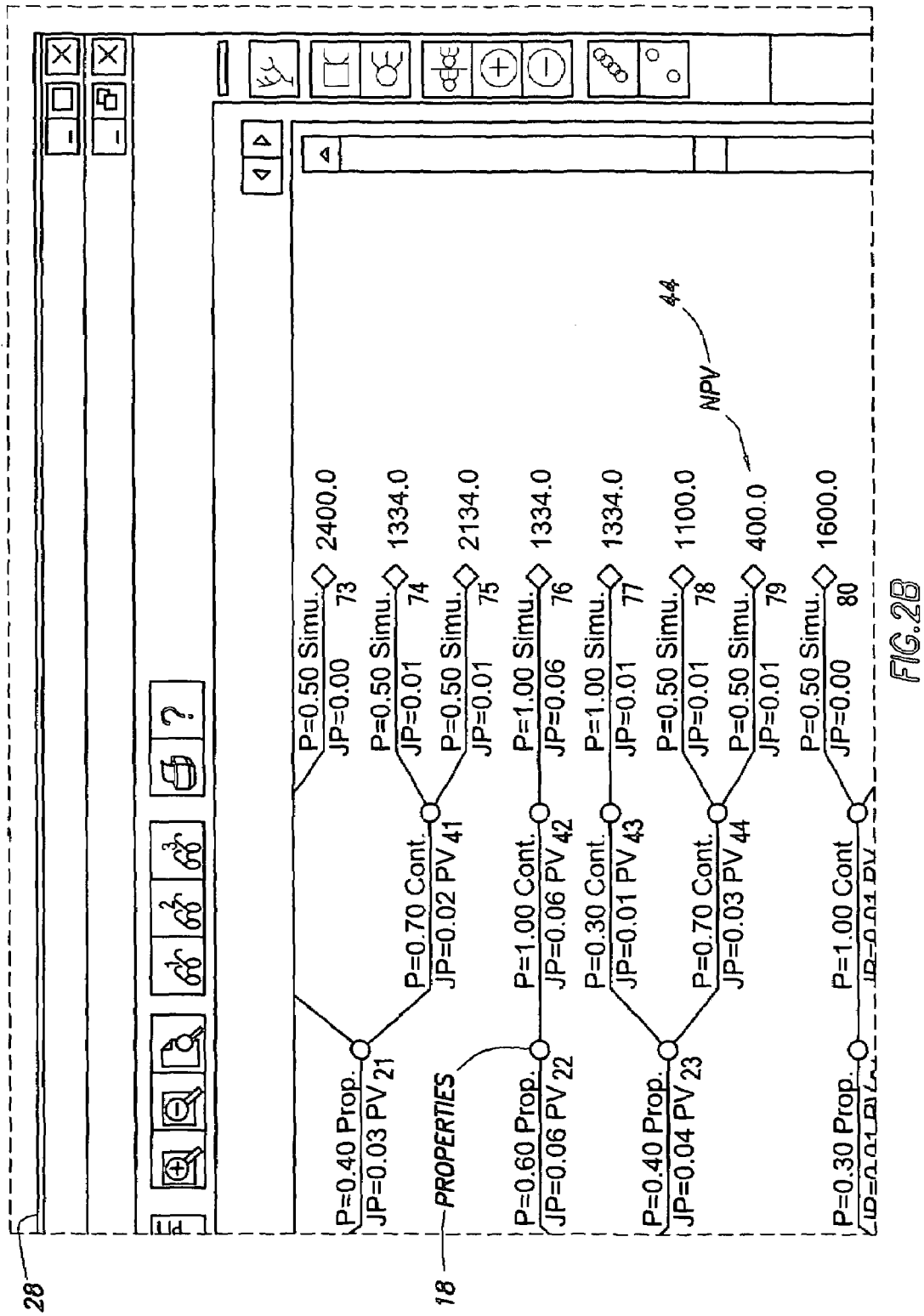
Figure 2C:
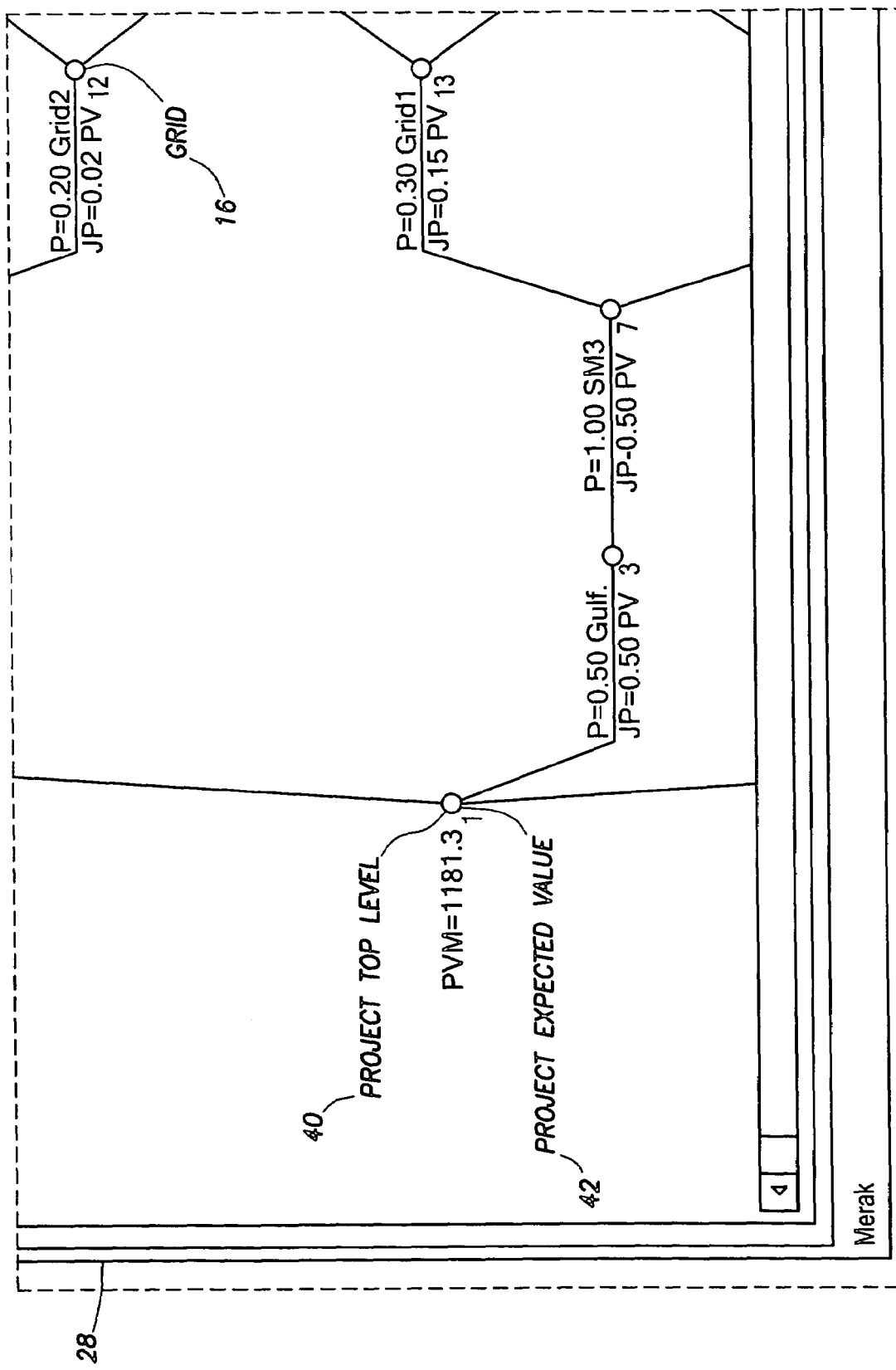
Figure 2D:
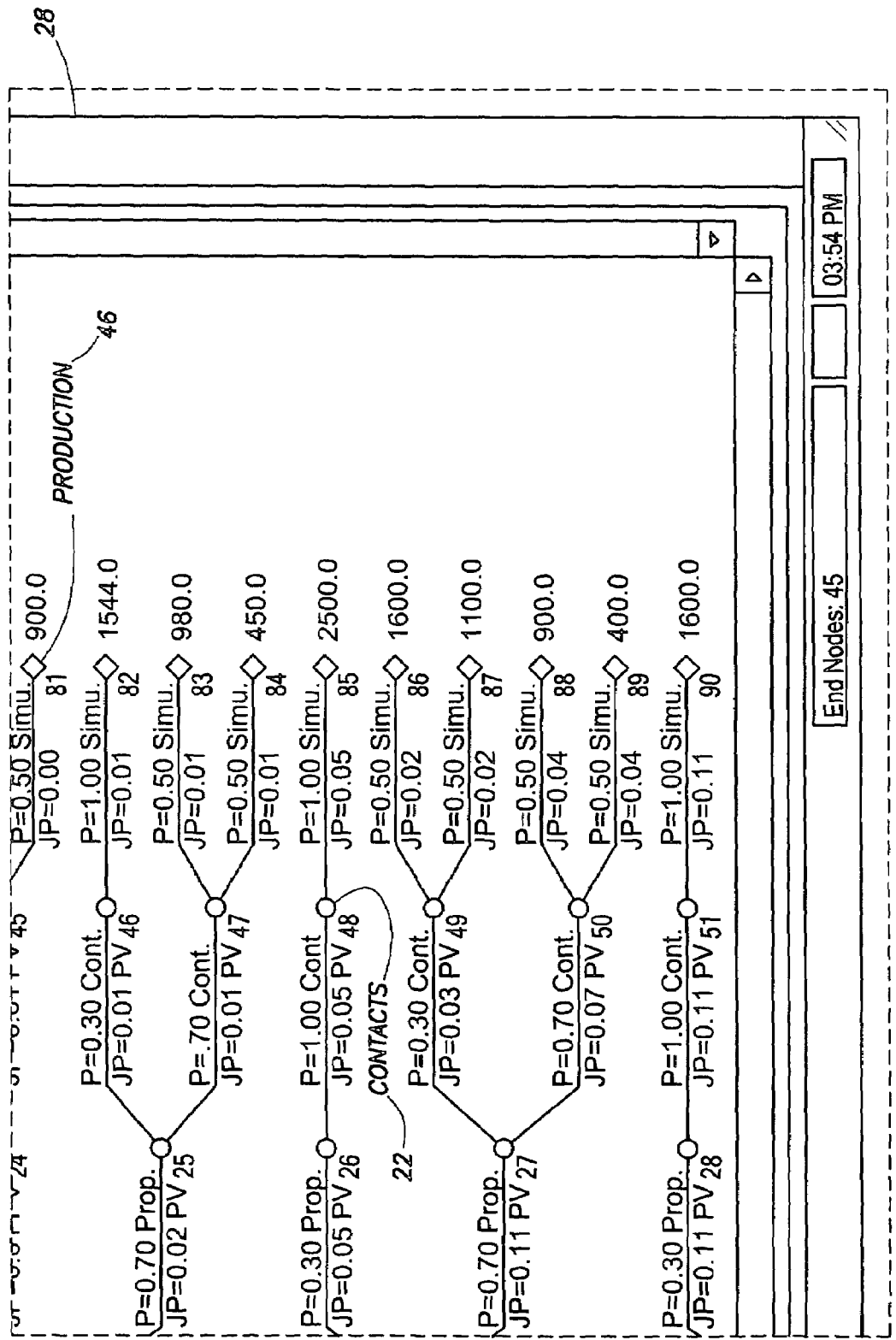
Figure 3A:
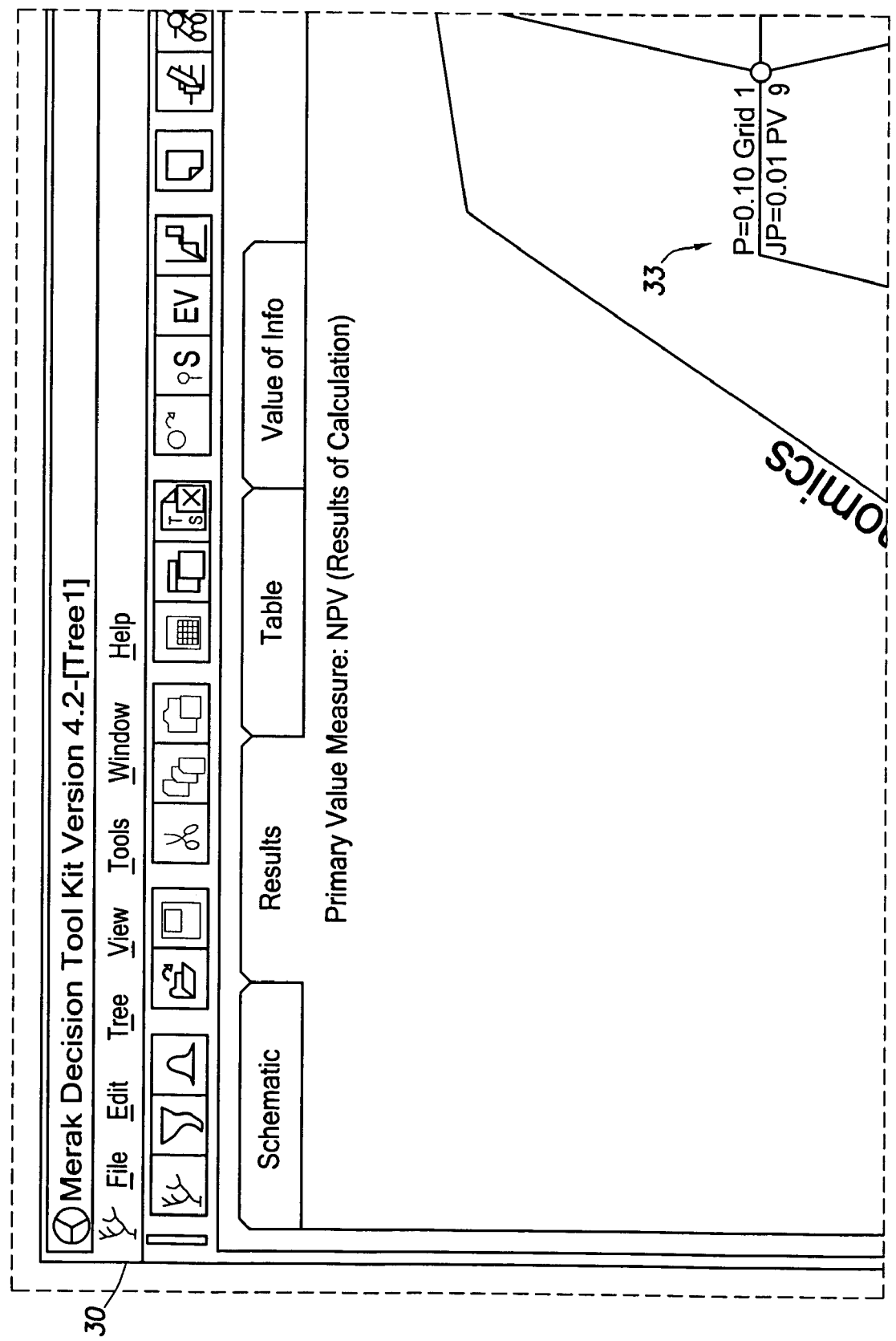
Figure 3B:
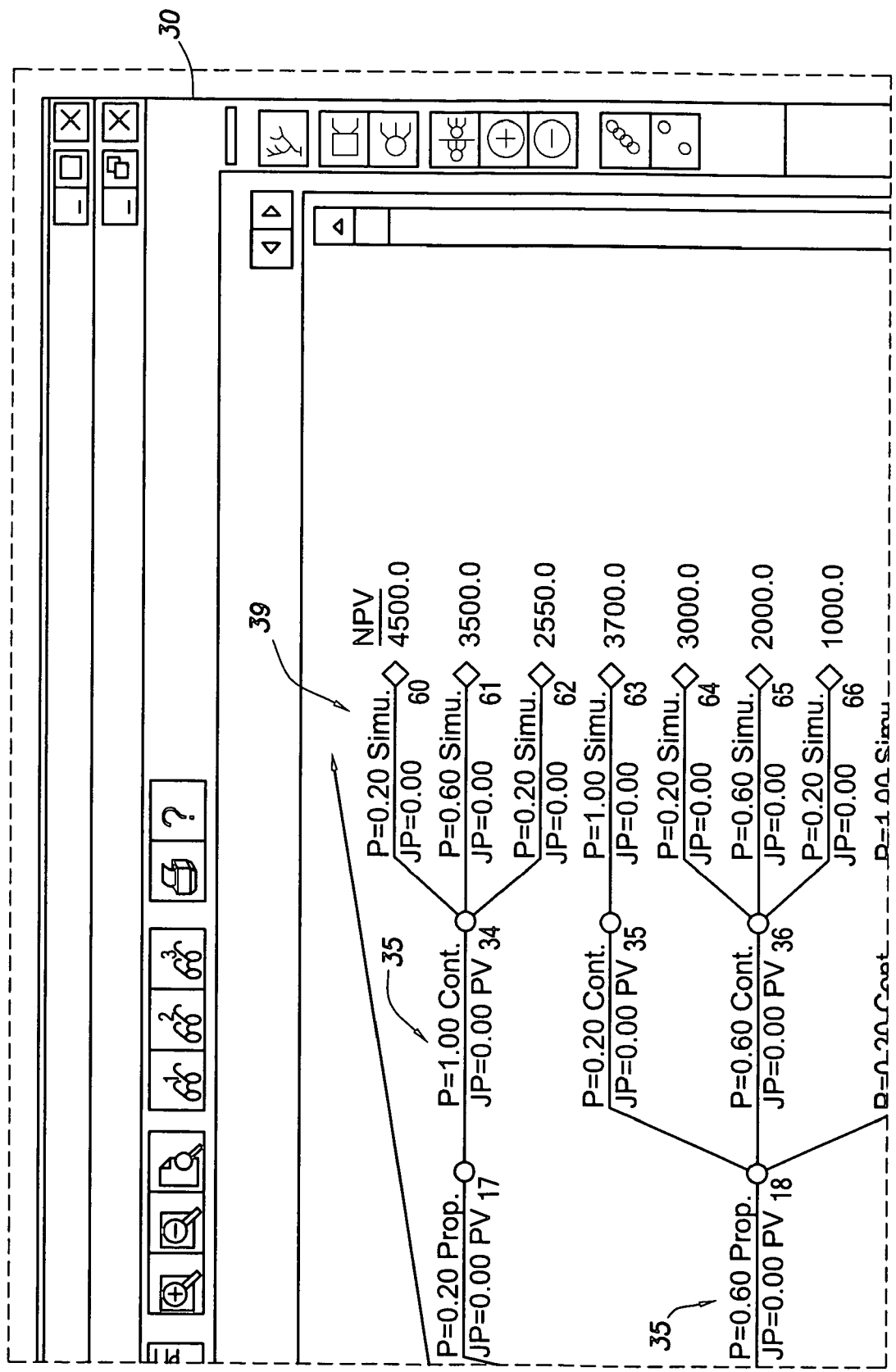
Figure 3C:
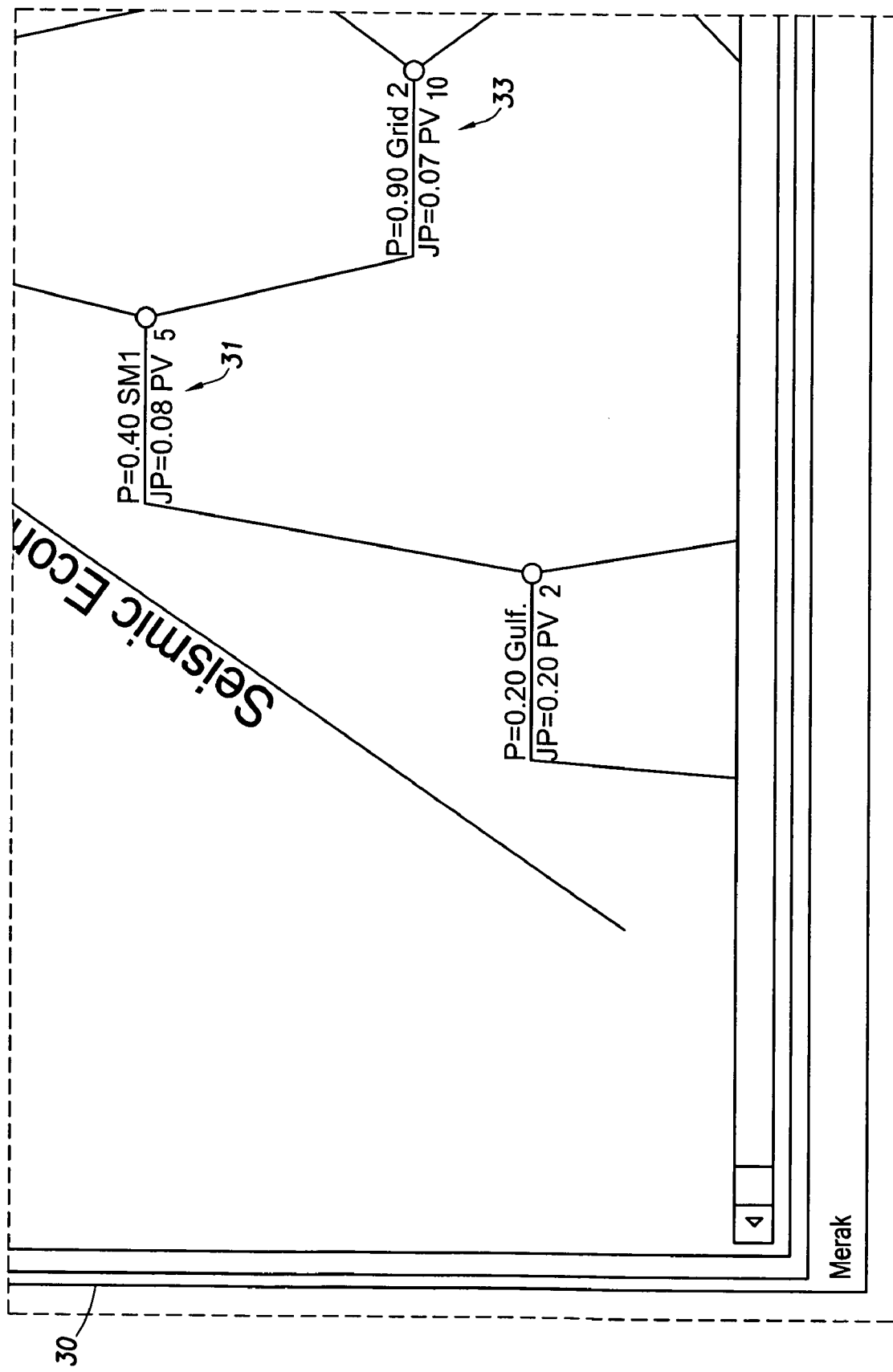
Figure 3D:
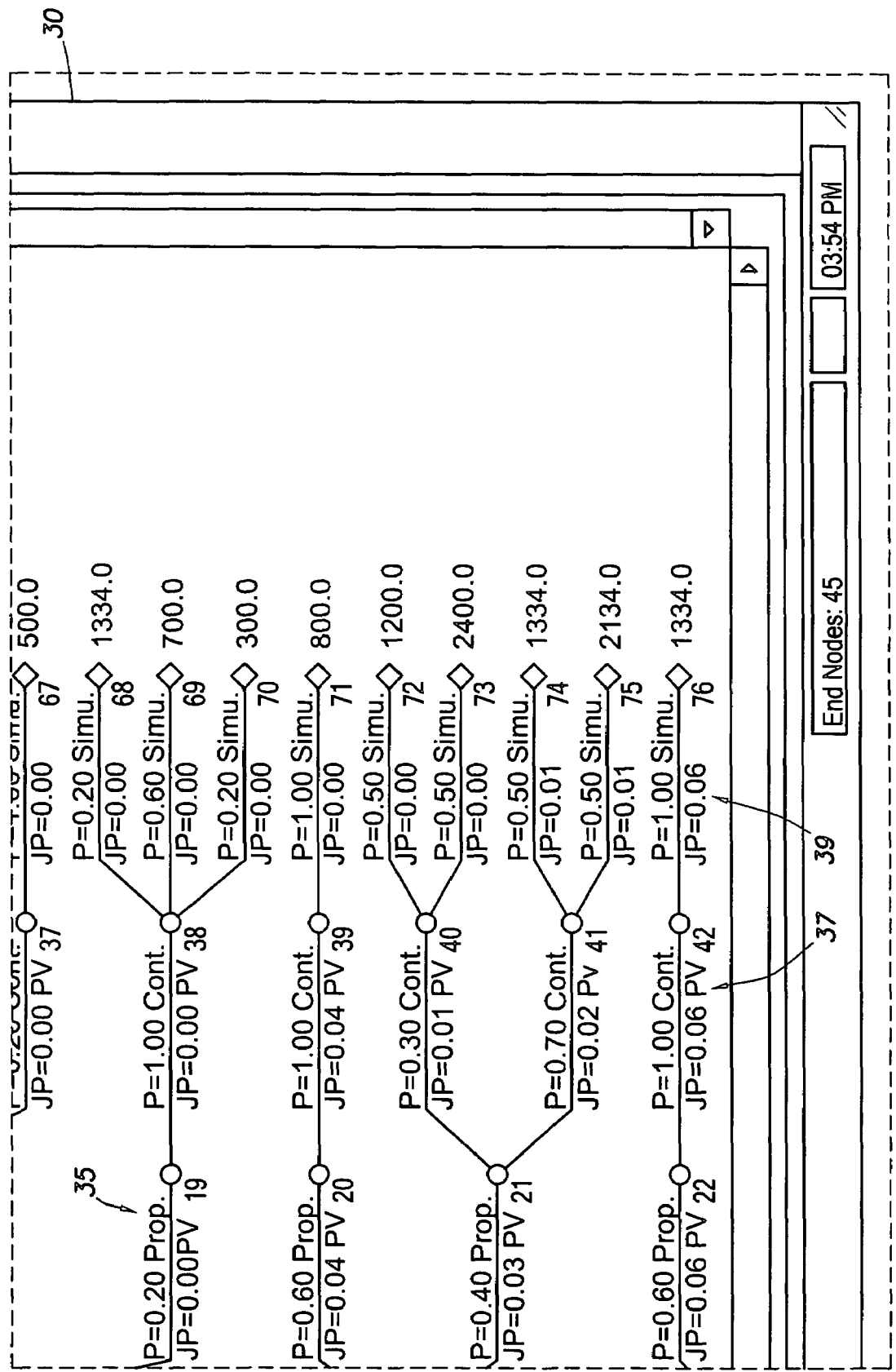
Figure 4A:
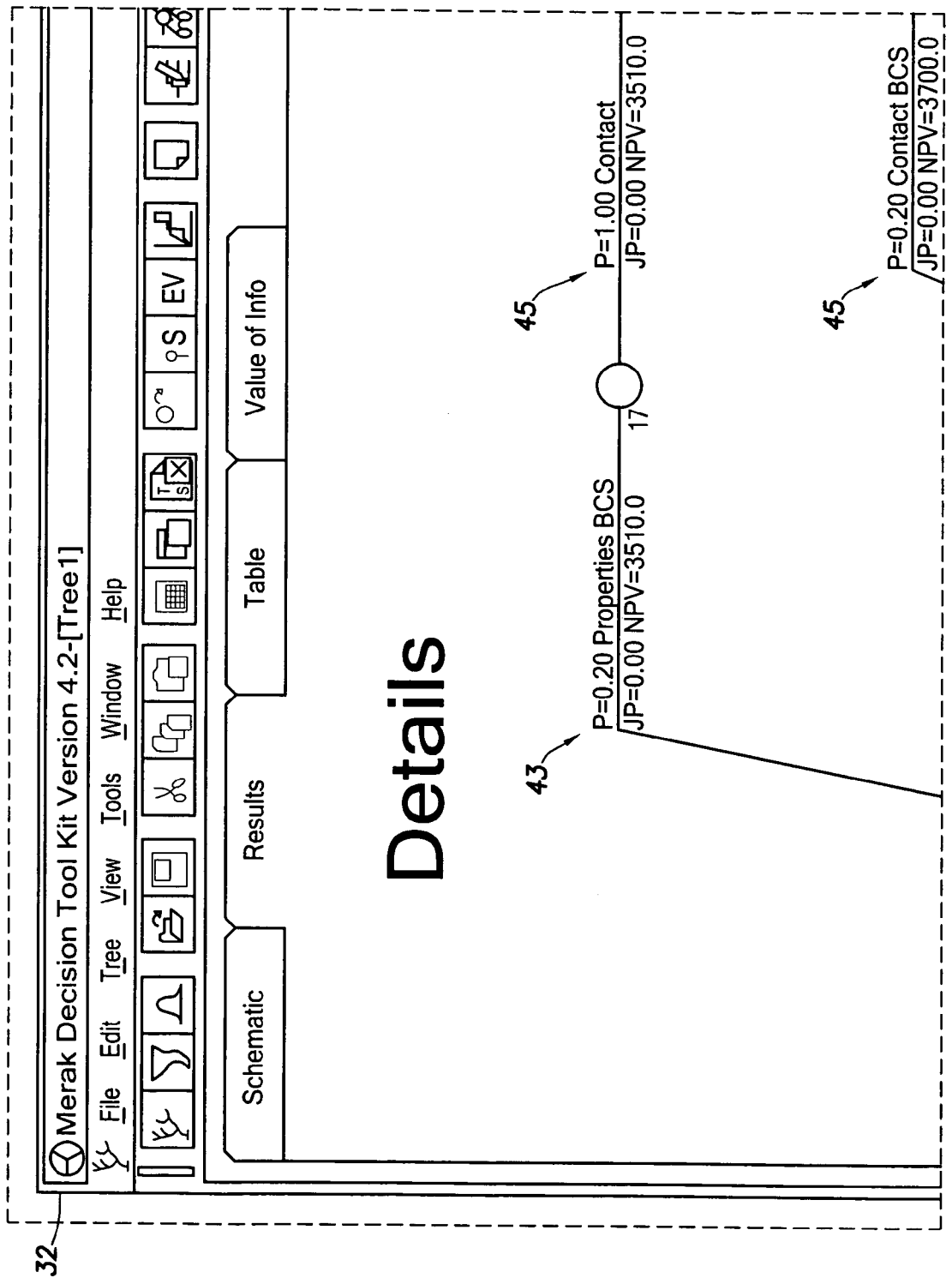
Figure 4B:
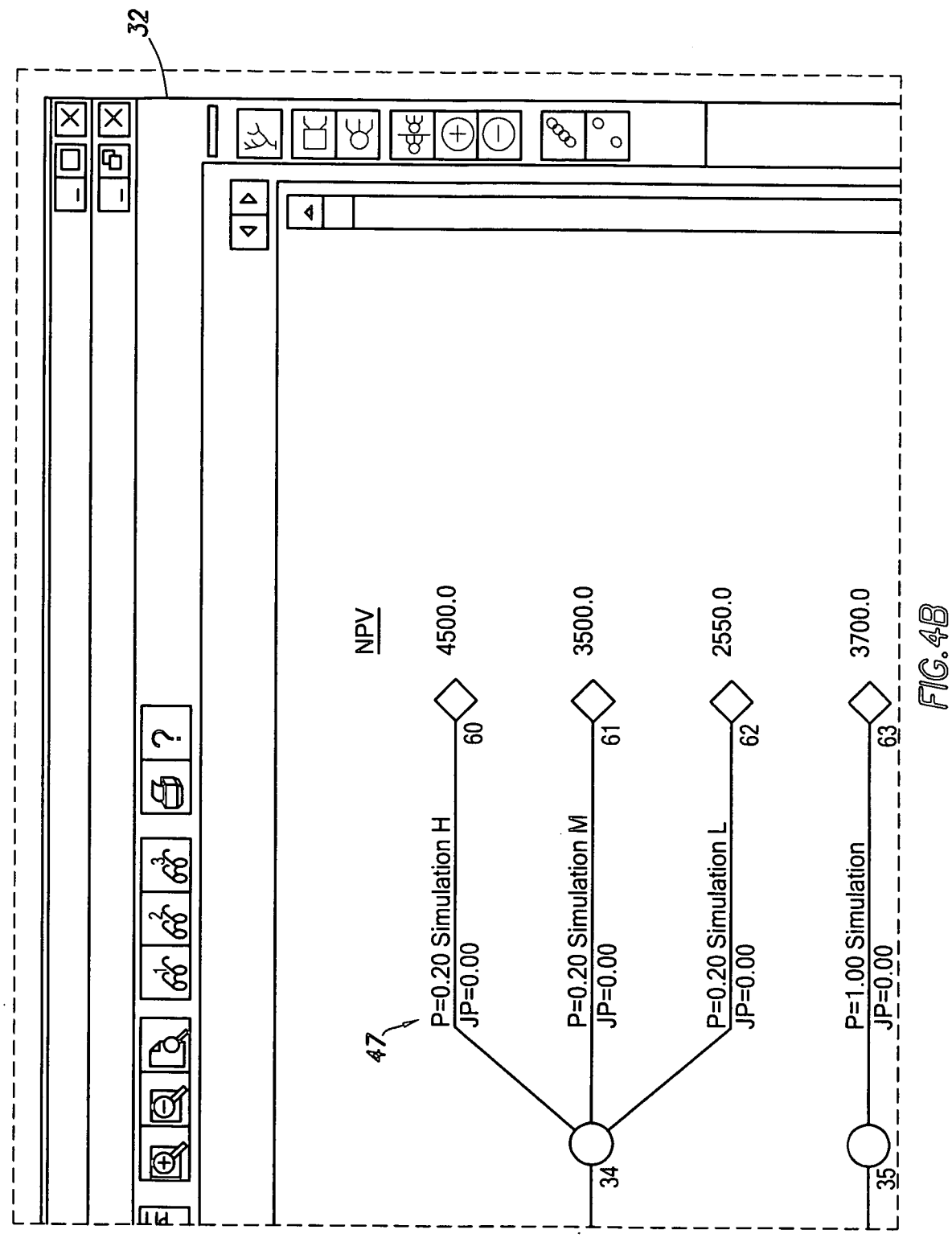
Figure 4C:
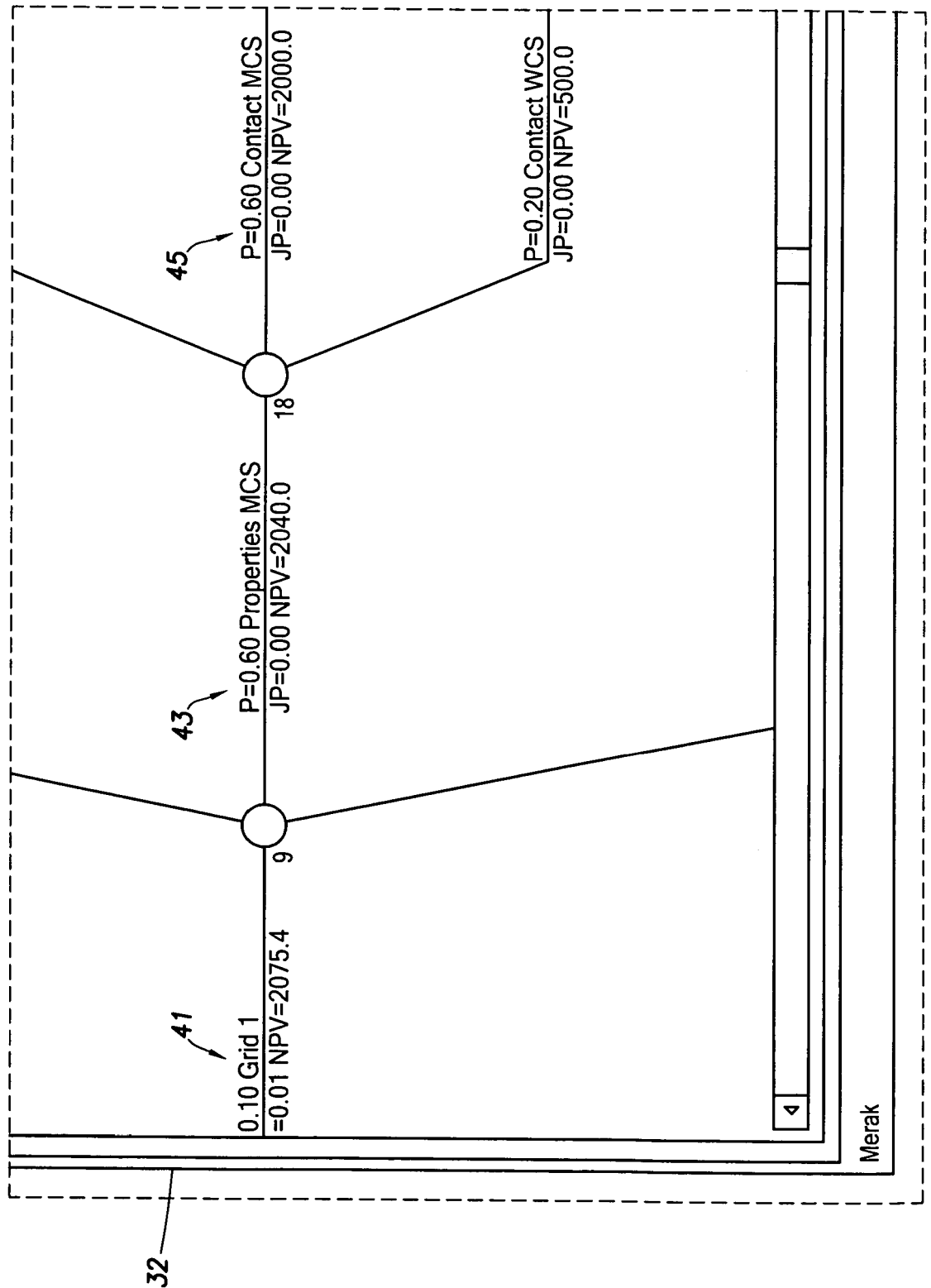
Figure 4D:
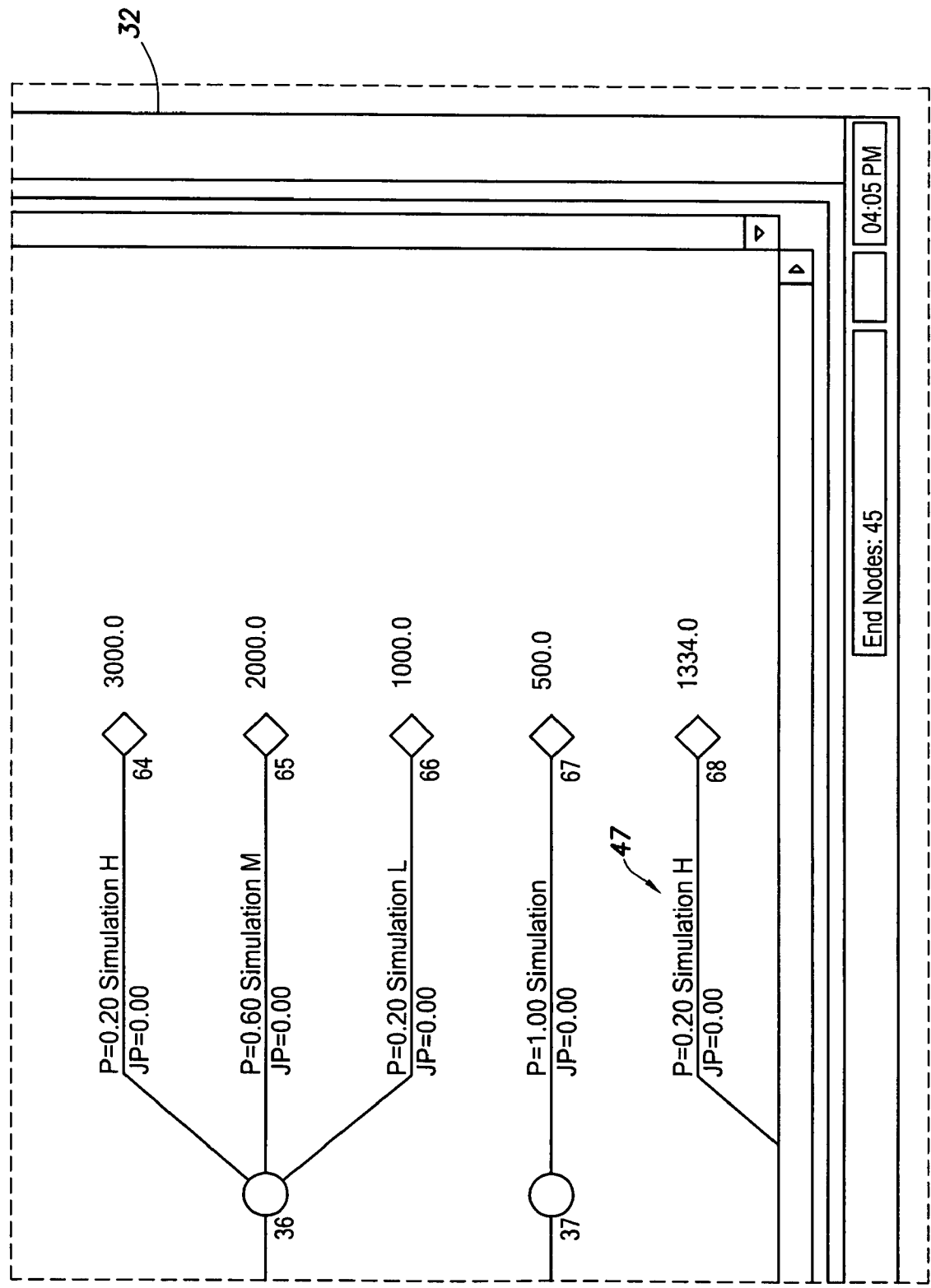

Referring to FIGS. 2, 2A, 2B, 2C, 2D, 3, 3A, 3B, 3C, 3D, 4, 4A, 4B, 4C, and 4D, examples of 'Decision Trees' 28, 30, and 32 which are generated from the 'seismic to simulation workflow' of FIG. 1 is illustrated. FIG. 2 illustrates Decision Tree 28, FIG. 3 illustrates Decision Tree 30, and FIG. 4 illustrates Decision Tree 32.

In FIGS. 2A-2D, in Decision Tree 28, locate the following 'elements' 12, 14, 16, 18, 22 and note that such 'elements' 12, 14, 16, 18, 22 are located in successive 'nodes' of the 'Decision Tree' 28: 'seismic' 12 is located at the first set of corresponding 'nodes' of the Tree 28; 'structure' 14 is located at the second set of corresponding 'nodes' of the Tree 28; '3D grid' 16 is located at the third set of corresponding 'nodes' of the Tree 28; '3D properties' 18 is located at the fourth set of corresponding 'nodes' of the Tree 28; and 'contacts' 22 is located at the fifth set of corresponding 'nodes' of the Tree 28. In FIG. 2A, along a 'branch' 38 of the Decision Tree 28, the 'probability' 34 is located on one side of the 'branch' 38 and the 'value measure' 36 is located on the other side of the 'branch' 38. Therefore, for branch 38, which is located between 'seismic' 12 and 'structure' 14 of the workflow of FIG. 1, the 'probability' 34 is given, and the 'value measure' 36 is also given. As a result, we know the 'probability' 34 and the 'value measure' 36 which exists at the output of the 'seismic' element 12 associated with the workflow of FIG. 1. In FIG. 2C, the 'project top level' 40 and 'project expected value' 42 are located at the first node of the Tree 28; and, in FIGS. 2B and 2D, the 'net present value (NPV)' 44 and the 'Production' 46 are located at the last set of nodes of the Tree 28.

In FIGS. 3 and 4, the Decision Trees 30 and 32 can be visualized in a similar manner as described above with reference to the Decision Tree 28 of FIG. 2. For example, in FIGS. 3A-3D, branches 31 represent 'structure' 14, branches 33 represent '3D grid' 16, branches 35 represent '3D properties' 18, and branches 37 represent 'contacts' 22, and branches 39 represent 'flow simulations' 24. In FIGS. 4A-4D, branch 41 represents '3D grid' 16, branch 43 represents '3D properties' 18, branch 45 represents 'contacts' 22, and branch 47 represents 'Flow Simulations' 24.

Figure 5:
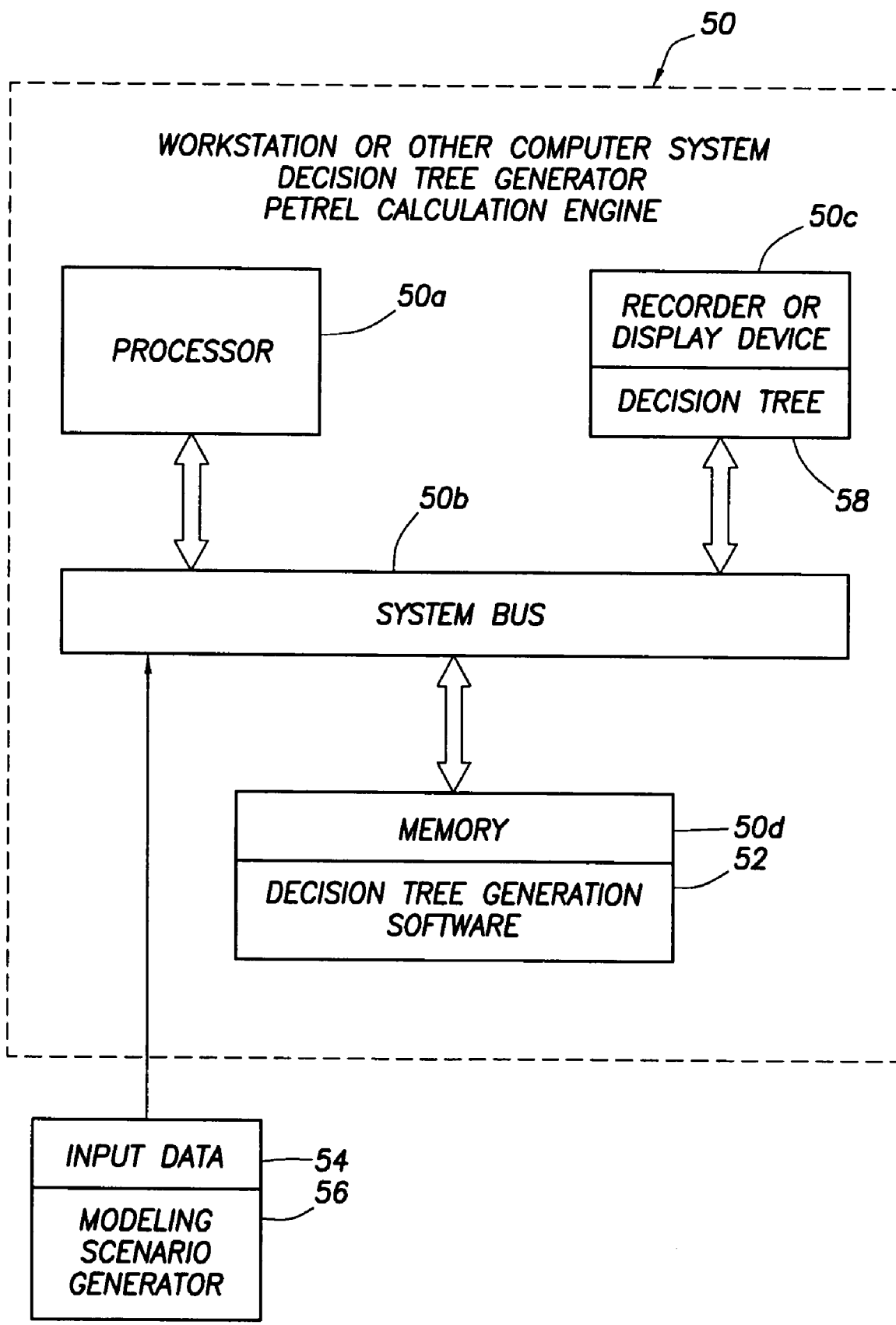
FIG. 5 illustrates a workstation or other computer system that stores the 'Decision Tree Generation Software' disclosed in this specification.

Referring to FIG. 5, a workstation or other computer system 50 that stores the 'Decision Tree Generation Software' 52 disclosed in this specification is illustrated. The workstation or other computer system 50 of FIG. 5 is also known as a 'Decision Tree Generator' 50 and a 'Petrel Calculation Engine' 50, terms which are used in connection with FIGS. 6 and 7.

In FIG. 5, a workstation, personal computer, or other computer system 50 (i.e., a Decision Tree Generator 50) is illustrated adapted for storing the Decision Tree Generation Software 52. The computer system/Decision Tree Generator 50 of FIG. 5 includes a processor 50a operatively connected to a system bus 50b, a memory or other program storage device 50d operatively connected to the system bus 50b, and a recorder or display device 50c operatively connected to the system bus 50b. The memory or other program storage device 50d stores the Decision Tree Generation Software 52. The Decision Tree Generation Software 52 is owned and operated by Schlumberger Technology Corporation of Houston, Tex. The Decision Tree Generation software 52 which is stored in the memory 50d of FIG. 5 can be initially stored on a CD-ROM, where that CD-ROM is also a 'program storage device'. That CD-ROM can be inserted into the computer system 50, and the Decision Tree Generation software 52 can be loaded from that CD-ROM and into the memory/program storage device 50d of the computer system 50 of FIG. 5. The computer system 50 of FIG. 5 receives 'input data' 54 which includes the 'modeling scenarios' generated by the 'modeling scenario generator' 56 shown in FIGS. 6 and 7. The processor 50a will execute the Decision Tree Generation software 52 stored in memory 50d while simultaneously using the 'input data' 54 including the 'modeling scenarios' generated by the 'modeling scenario generator' 56; and, responsive thereto, the processor 50a will generate a 'Decision Tree' 58 which is adapted to be recorded by or displayed on the Recorder or Display device 50c in FIG. 5. The computer system 50 of FIG. 5 may be a personal computer (PC), a workstation, a microprocessor, or a mainframe. Examples of possible workstations include a Silicon Graphics Indigo 2 workstation or a Sun SPARC workstation or a Sun ULTRA workstation or a Sun BLADE workstation. The memory or program storage device 50d is a computer readable medium or a program storage device which is readable by a machine, such as the processor 50a. The processor 50a may be, for example, a microprocessor, microcontroller, or a mainframe or workstation processor. The memory or program storage device 50d, which stores the Decision Tree Generation Software 52 may be, for example, a hard disk, ROM, CD-ROM, DRAM, or other RAM, flash memory, magnetic storage, optical storage, registers, or other volatile and/or non-volatile memory.

Figure 6:
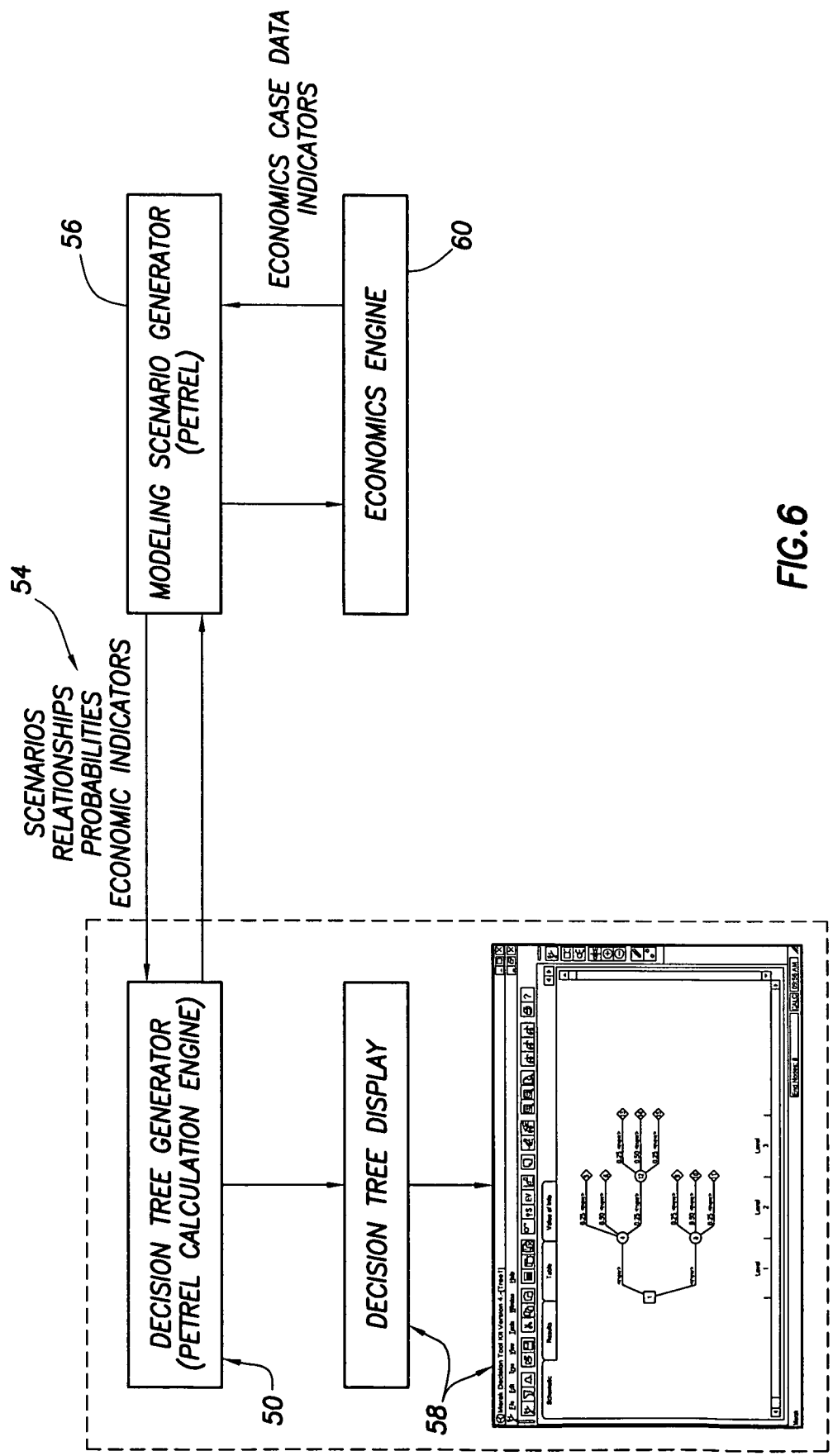
FIGS. 6, 7, and 8 illustrate a construction and a function associated with the 'Decision Tree Generation Software' which is illustrated in FIG. 5.
Figure 7:
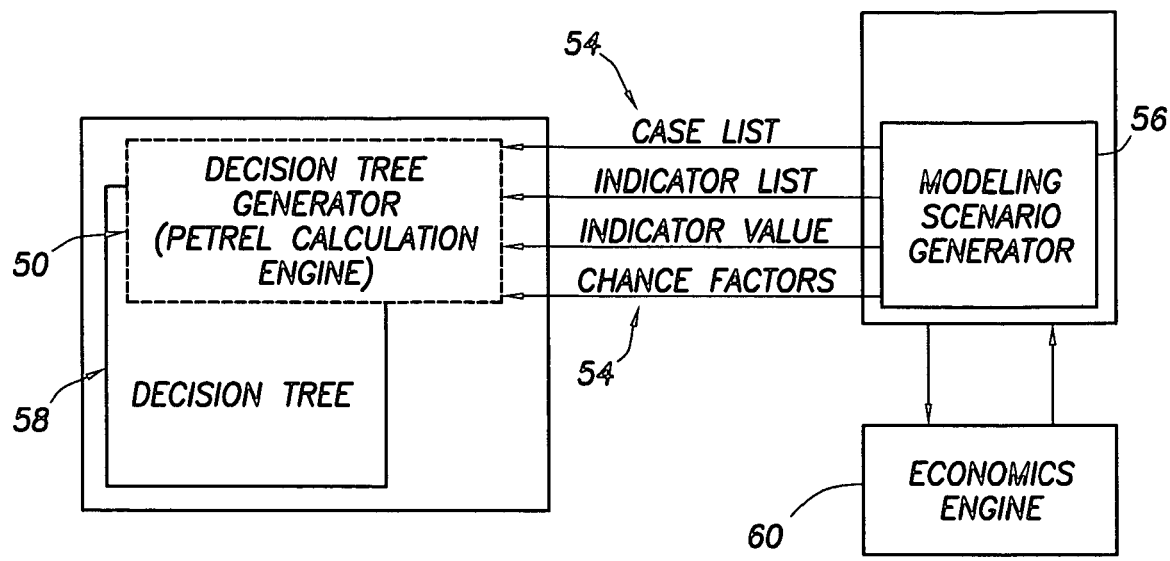

Referring to FIGS. 6 and 7, the computer system/Decision Tree Generator 50 of FIG. 5 is illustrated. In FIG. 6, the Decision Tree Generator 50 (i.e., the Petrel Calculation Engine 50) receives 'input data' 54 from the 'modeling scenario generator' 56, which is adapted for generating the 'modeling scenarios' defined with reference to FIG. 1, where that 'input data' 54 includes: scenarios, relationships, probabilities, and economic indicators. The 'modeling scenario generator' 56 receives 'economic case data indicators' from an 'economics engine' 60 and generates the 'modeling scenarios' which were defined above with reference to FIG. 1. In response to that 'input data', the Decision Tree Generator 50 (i.e., the Petrel Calculation Engine 50) generates a Decision Tree display 58, further examples of which are shown in FIGS. 2, 3, and 4 (in addition to FIG. 6). In FIG. 7, the 'input data' 54 that the Decision Tree Generator 50 receives from the 'modeling scenario generator' 56 further includes: a case list, an indicator list, indicator values, and chance factors (in addition to the scenarios, relationships, probabilities, and economic indicators of FIG. 6). In FIG. 7, as noted in FIG. 6, in response to that 'input data' 54, the Decision Tree Generator 50 (i.e., the Petrel Calculation Engine 50) generates a Decision Tree display 58, further examples of which are shown in FIGS. 2, 3, and 4. In operation, referring to FIGS. 6 and 7, recall from FIG. 1 that the 'seismic simulation workflow' 10 of FIG. 1 actually includes a 'multiple number of workflows' where 'each workflow' of the 'multiple number of workflows' represents a single 'modeling scenario'. The 'modeling scenario generator' 56 in FIGS. 6 and 7 will generate a 'multiple number of modeling scenarios' representing a 'multiple number of workflows' (similar to the workflows 10 shown in FIG. 1) including the following above referenced 'input data': a case list, an indicator list, indicator values, chance factors in addition to the scenarios, relationships, probabilities, and economic indicators. In response to the 'multiple number of modeling scenarios' received from the 'modeling scenario generator' 56, the 'Decision Tree Generator' 50 in FIGS. 6 and 7 will generate a 'Decision Tree display' 58, such as the 'Decision Tree display' 58 shown in FIG. 6 (and also shown in FIGS. 2, 3, and 4).

Figure 8:
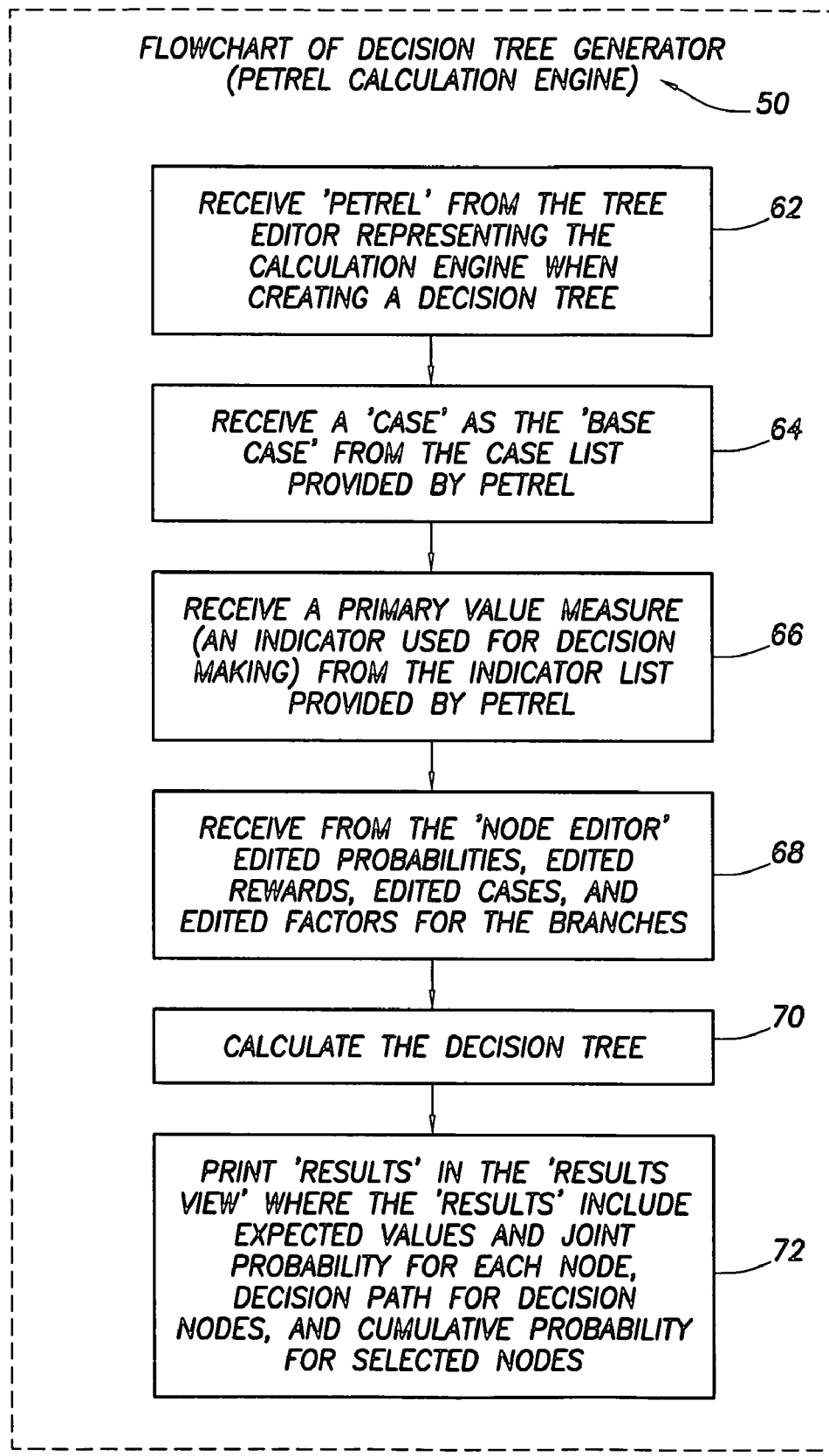

Referring to FIG. 8, a flowchart depicting the function practiced by the Decision Tree Generator/Petrel Calculation Engine/workstation or other computer system 50 of FIGS. 5, 6 and 7 is illustrated.

In FIG. 8, when creating a 'Decision Tree' similar to the Decision Tree illustrated in FIGS. 2, 3, 4, and 6, the Decision Tree Generator 50 will: (1) receive 'Petrel' from the 'Tree Editor' representing a calculation engine that is selected by the modeler/interpreter, step 62 in FIG. 8 (2) receive a case as the base case selected by the modeler/interpreter from the case list provided by 'Petrel', step 64 in FIG. 8, (3) receive a Primary Value Measure (which is an indicator used for decision making), selected by the modeler/interpreter, from the indicator list provided by 'Petrel', step 66 in FIG. 8, (4) receive, from the 'node editor', edited probabilities, edited rewards, edited cases, and edited factors, which are edited/selected by the modeler/interpreter, for the branches of the Decision Tree, step 68 shown in FIG. 8, (5) calculate the Decision Tree, step 70 of FIG. 8, and (6) print 'results' in the 'results view' where the 'results' include expected values and joint probability for each node, decision path for decision nodes, and cumulative probability for selected nodes, step 72 of FIG. 8. Each of these steps 62, 64, 66, 68, 70, and 72 shown in FIG. 8 will be discussed in more detail below with reference to FIGS. 10-20.

Figure 9:
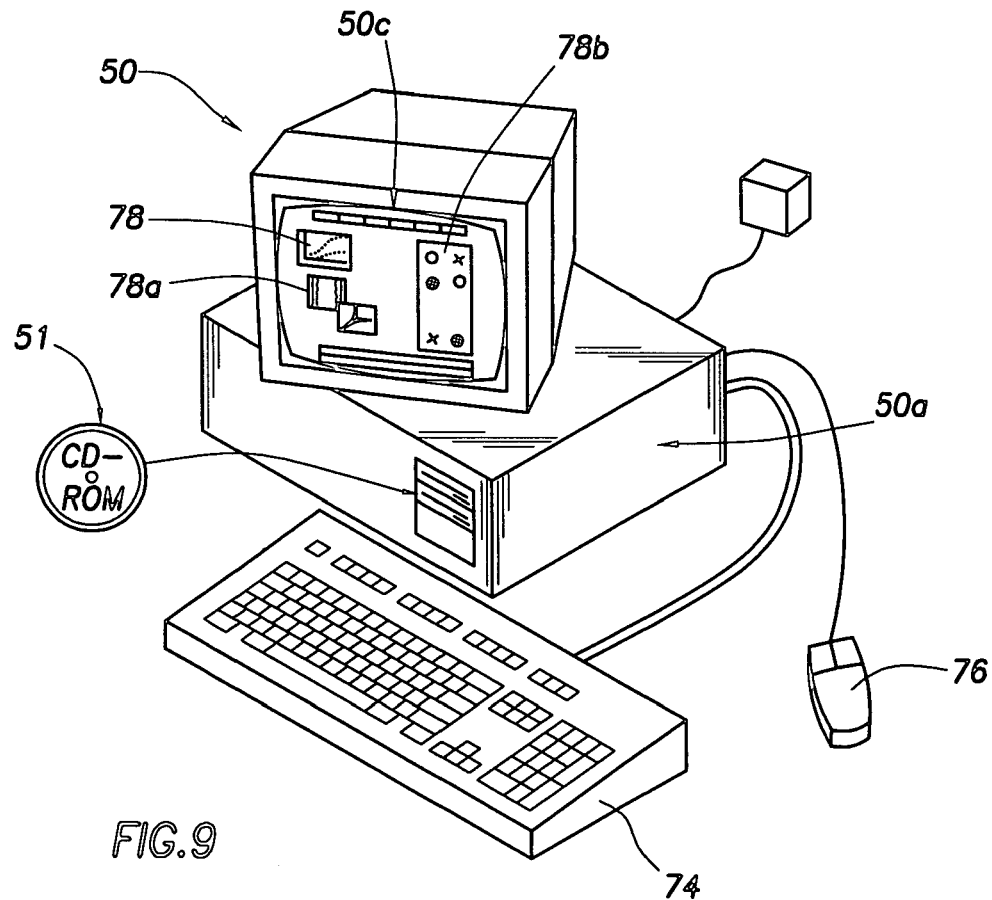
FIG. 9 illustrates the workstation or other computer system of FIG. 5; however, in FIG. 9, the computer system includes a 'display screen' adapted for displaying 'windows' or 'dialogs' in response to the execution of the 'Decision Tree Generation Software' by the processor of the computer system, and a mouse where a user can use the mouse to 'click on' certain 'buttons' disposed within the 'windows' or 'dialogs' that are being displayed on the 'display screen' thereby generating other such 'windows' or 'dialogs'.

Referring to FIG. 9, another view of the 'workstation or other computer system' 50 (also known as the Decision Tree Generator and the Petrel Calculation Engine 50) shown in FIG. 5 is illustrated.

In FIG. 9, the 'workstation or other computer system' 50 which stores the Decision Tree Generation Software 52 of FIG. 5 includes a monitor having a 'display device' 50c, a processor 50a, a keyboard 74, and a mouse 76. A CD-Rom 51 initially stores therein the 'Decision Tree Generation Software' 52 of FIG. 5, the 'Decision Tree Generation Software' 52 being subsequently loaded from the CD-Rom 51 into the memory 50d of the computer system 50 shown in FIG. 5. In FIG. 9, the 'display device' 50c will display 'windows and dialogs' 78 having one or more 'buttons', and the user/operator will use the mouse 76 to 'click on' the 'buttons' that are being displayed within the 'windows and dialogs' 78 in order to display other such 'windows and dialogs' 78. For example, the user may click-on a 'button' set forth within 'a first window/dialog' 78a that is being displayed on the 'display device' 50c; and, in response thereto, a 'second window/dialog' 78b will then be displayed on the 'display device' 50c.

In FIGS. 8 and 9, when the user (i.e., the modeler/interpreter) clicks-on a 'button' set forth within the 'first window/dialog' 78a that is being displayed on the 'display device' 50c of FIG. 9, referring to the steps in FIG. 8, the user can select 'Petrel' as the calculation engine (step 62 of FIG. 8), the user can select a case as the base case from the case list (step 64 of FIG. 8), the user can select a primary value measure from the indicator list (step 66 of FIG. 8), and the user can edit probabilities, rewards, cases, and factors (step 68 of FIG. 8).

In FIGS. 8 and 9, the 'windows and dialogs' 78, 78a, 78b of FIG. 9 are being displayed on the 'display device' 50c of the workstation or other computer system (Decision Tree Generator or Petrel Calculation Engine) 50 of FIGS. 5 and 9 in response to the execution of the Decision Tree Generation Software 52 by the processor 50a of the computer system/Decision Tree Generator 50. Those 'windows and dialogs' 78, 78a, 78b will enable the user modeler/interpreter to select the 'Petrel' calculation engine (step 62 of FIG. 8) and to select a case as the base case (step 64 of FIG. 8) and to select a primary value measure (step 66 of FIG. 8) and to edit probabilities and rewards and cases and factors (step 68 of FIG. 8). The 'windows and dialogs' 78, 78a, 78b shown in FIG. 9 will be discussed in more detail below with reference to FIGS. 10 through 20 of the drawings.

Figure 10:
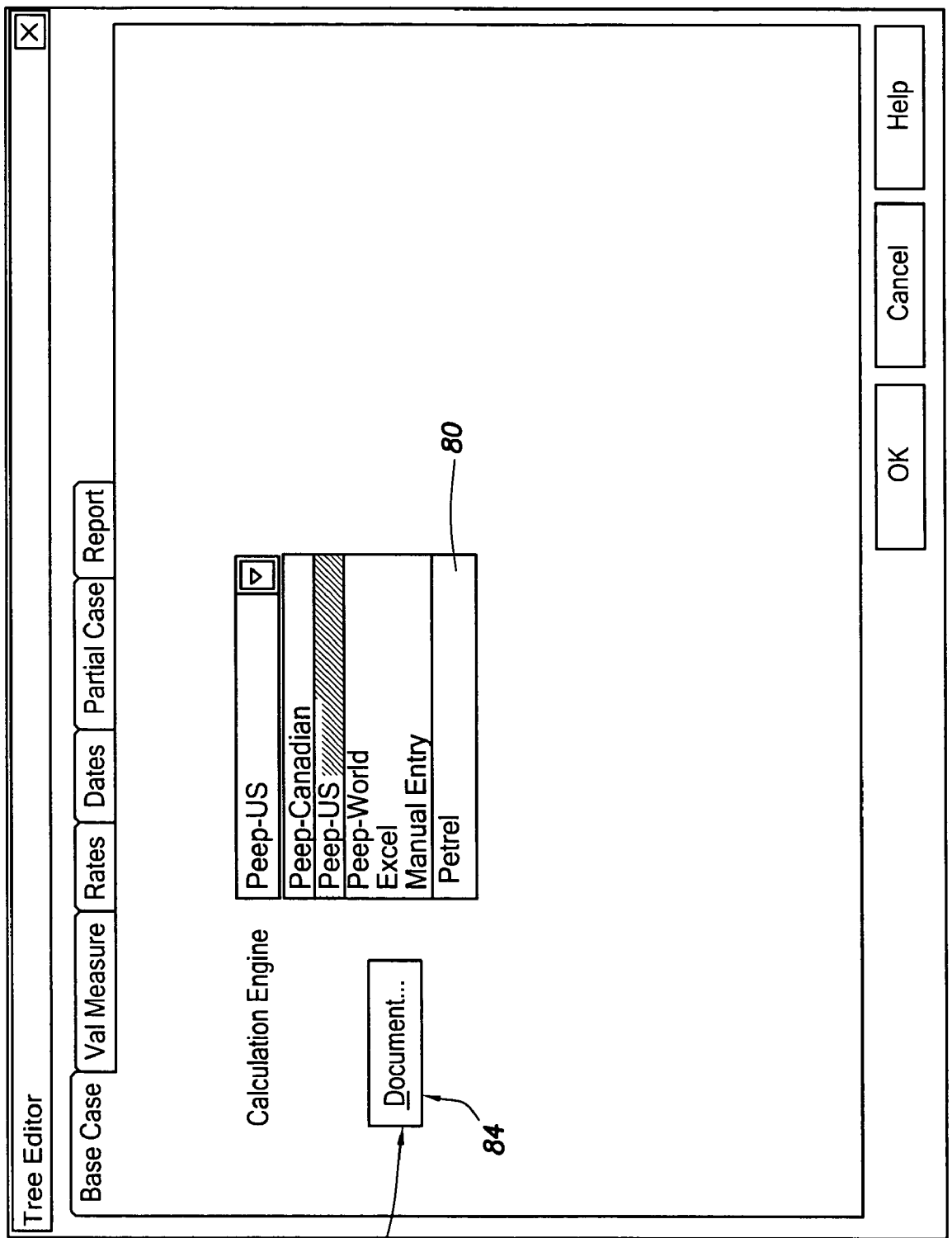

Referring to FIG. 10, a 'first window/dialog' 78, that is displayed on the 'display device' 50c of the computer system/Decision Tree Generator 50 of FIGS. 5 and 9 in response to execution of the Decision Tree Generation Software 52 by processor 50a, is illustrated.

In FIG. 8, consider the first two steps 62 and 64 practiced by the Decision Tree Generator 50 for the purpose of calculating a Decision Tree and displaying 'results', as follows:

(Step 1) Receive 'Petrel' from the 'Tree Editor' representing a calculation engine that is selected by the modeler/interpreter, step 62 in FIG. 8, and (Step 2) Receive a case as the base case selected by the modeler/interpreter from the case list provided by 'Petrel', step 64 in FIG. 8.

In FIG. 10, 'Step 1' (step 62 in FIG. 8) is accomplished by selecting 'Petrel' 80 as the calculation engine (numeral 80 in FIG. 10). The calculation engine is a tool used to calculate the 'value measure'. In addition, 'Step 2' is accomplished by 'selecting a case as the base case' (numeral 82 in FIG. 10), and this is accomplished by 'clicking-on' the 'Document' button 84 in FIG. 10. The 'Document' button 84 will bring up a list of cases which are based on the calculation engine selected (such as the 'Petrel' 80 calculation engine). When the base case is selected, the base case will be applied across the entire Decision Tree unless the user defines a new one for a specific branch.

Figure 11:
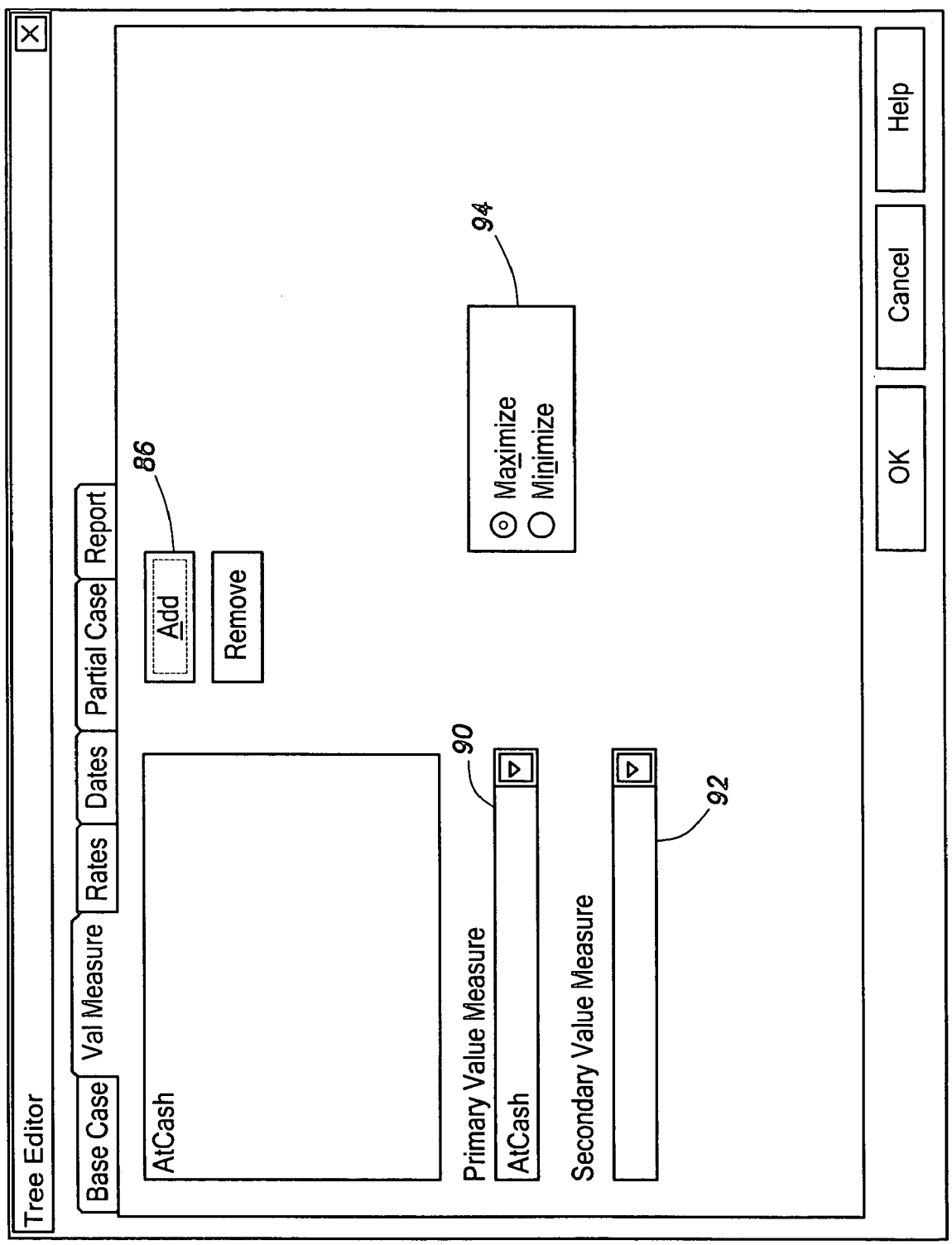
Figure 12:
Figure 13A:
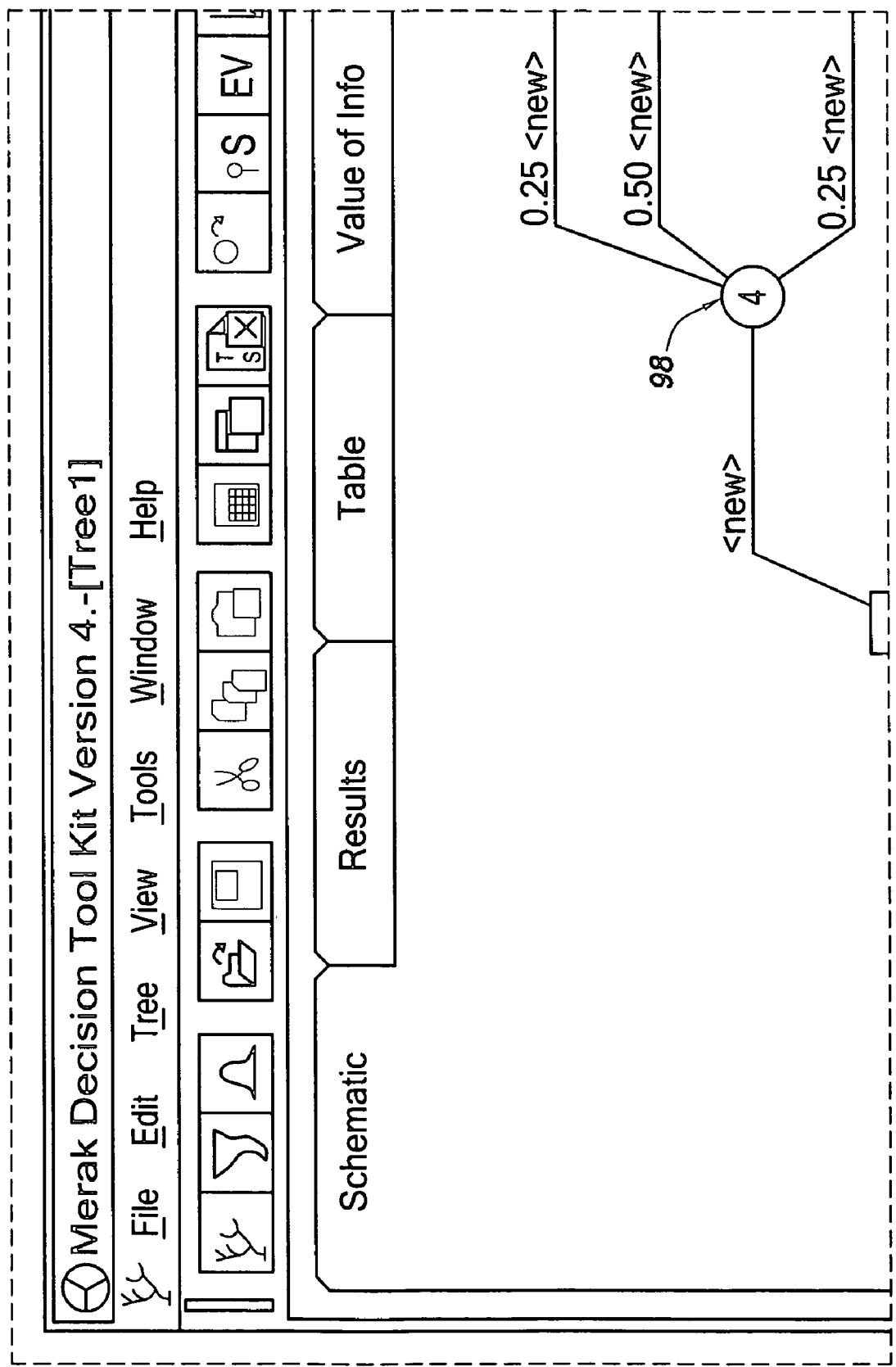
Figure 13B:
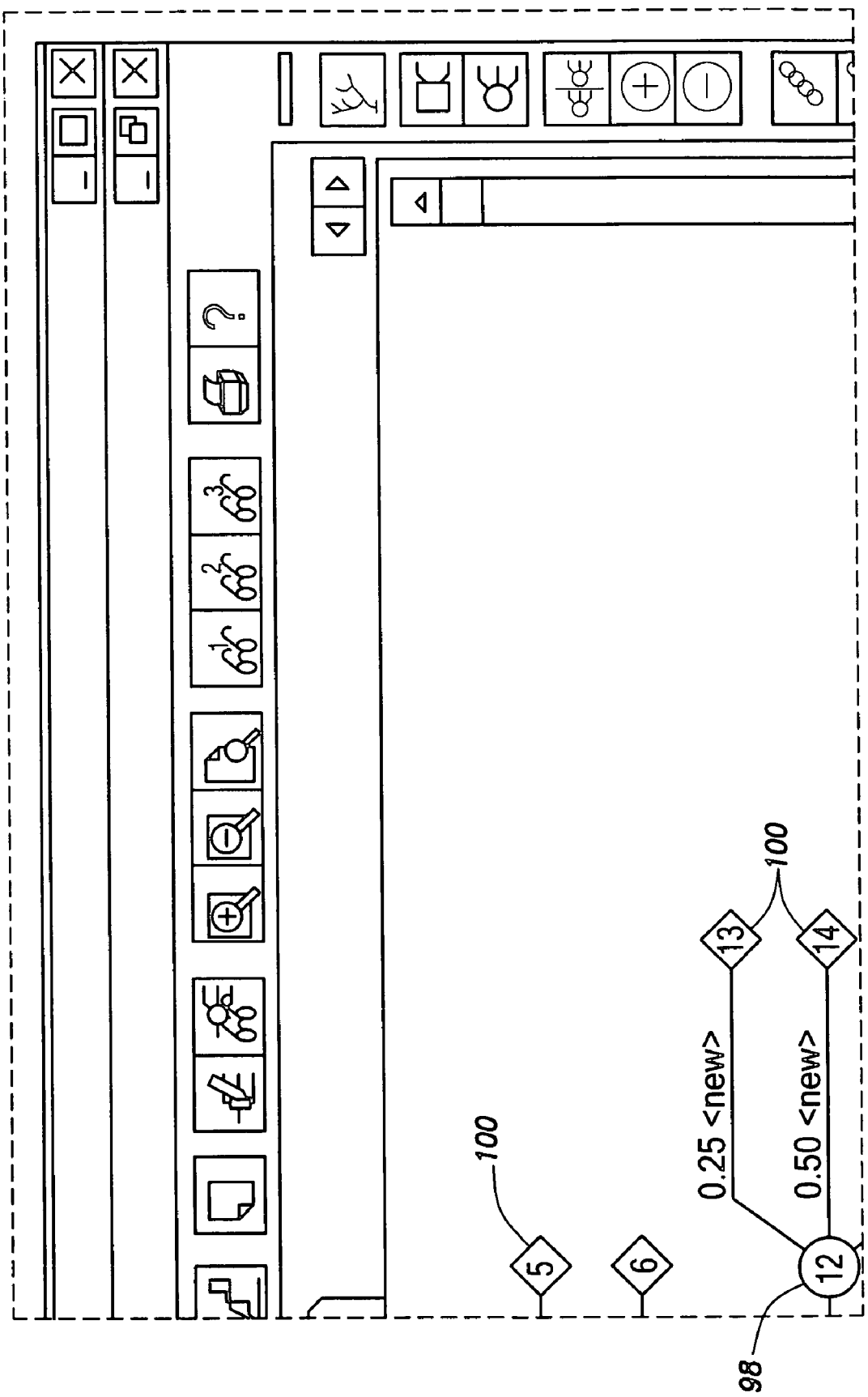
Figure 13C:
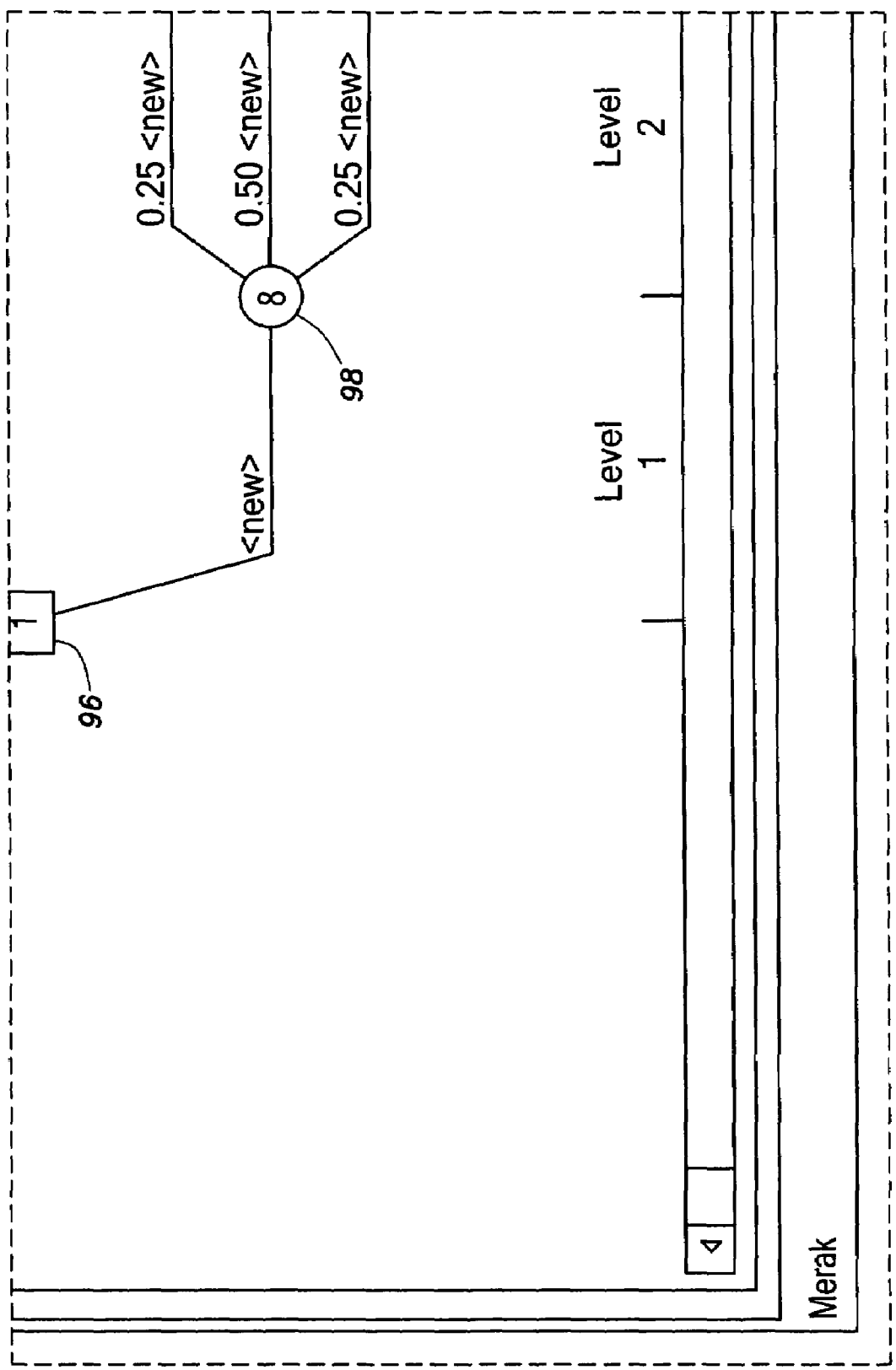
Figure 13D:
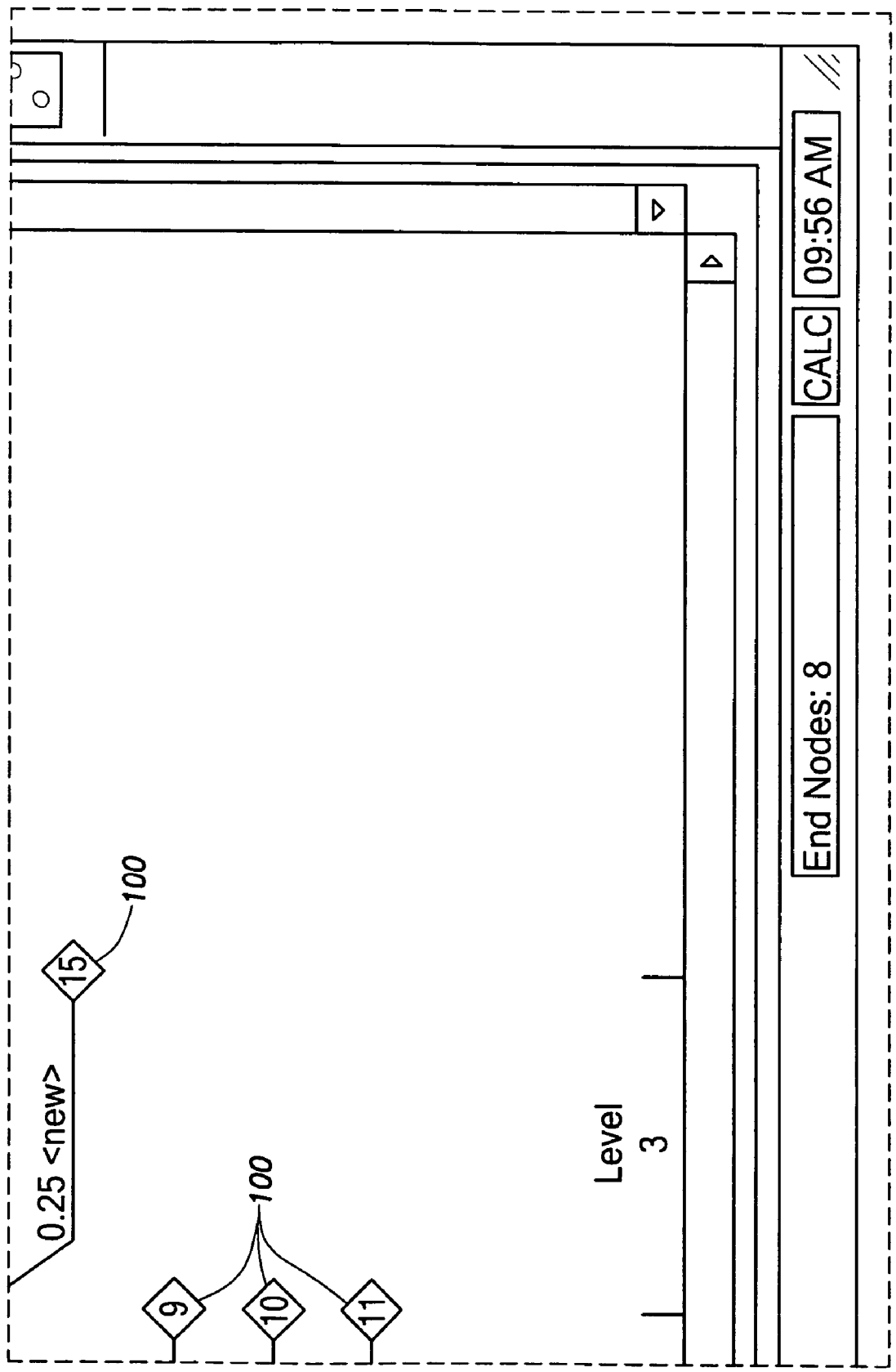

Referring to FIGS. 11 and 12, 'second and third window/dialogs' 78, that are displayed on the 'display device' 50c of the computer system/Decision Tree Generator 50 of FIGS. 5 and 9 in response to execution of the Decision Tree Generation Software 52 by processor 50a, are illustrated.

In FIG. 8, consider the third step 66 practiced by the Decision Tree Generator 50 for the purpose of calculating a Decision Tree and displaying 'results', as follows:

(Step 3) Receive a Primary Value Measure (which is an indicator used for decision making), selected by the modeler/interpreter, from the indicator list provided by 'Petrel', step 66 in FIG. 8.

In FIG. 11, clicking-on the 'Add' button 86 will bring-up and display a list of indicators set forth in the 'window/dialog' shown in FIG. 12.

In FIG. 12, select a 'primary value measure' from the list of indicators 88 shown in FIG. 12. Select a 'secondary value measure' from the list of indicators 88 in FIG. 12.

In FIG. 11, the selected 'primary value measure' (selected from FIG. 12) will appear in space 90 shown in FIG. 11. The value of the 'primary value measure' will be used in decision making. The selected 'secondary value measure' (selected from FIG. 12) will appear in space 92 shown in FIG. 11. In FIG. 11, set the decision criteria, which is either 'maximize' or 'minimize' (see numeral 94 in FIG. 11).

Referring to FIGS. 13, 13A, 13B, 13C, 13D, and 14, 'fourth and fifth window/dialogs' 78, that are displayed on the 'display device' 50c of the computer system/Decision Tree Generator 50 of FIGS. 5 and 9 in response to execution of the Decision Tree Generation Software 52 by processor 50a, are illustrated.

In FIG. 8, consider the fourth step 68 and the fifth step 70 practiced by the Decision Tree Generator 50 for the purpose of calculating a Decision Tree and displaying 'results', as follows:

(Step 4) Receive, from the 'node editor', edited probabilities, edited rewards, edited cases, and edited factors, which are edited/selected by the modeler/interpreter, for the branches of the Decision Tree, step 68 shown in FIG. 8.

(Step 5) Calculate the Decision Tree, step 70 of FIG. 8.

In FIGS. 13, 13A, 13B, 13C, 13D and 14, a 'Decision Tree' is calculated and constructed which includes adding/deleting nodes and adding/deleting branches.

In FIG. 13, note the 'Decision Node' 96, which has a 'square shape'. Here, you cannot set probabilities for decision nodes. The calculation will make a decision for each decision node based on the decision criteria.

In FIG. 13, note the 'Uncertainty node' 98, which has a 'circle shape'. Each branch of an uncertainty node 98 is assigned a probability. The expected value of an uncertainty node 98 is calculated based on the branch probabilities and the expected values of corresponding connecting nodes.

In FIG. 13, note the 'End node' 100, which has a 'diamond shape'. Hold the original value measure (indicator) values which will be used for roll-back calculation In FIG. 14, double-click a node 96, 98, 100 in FIG. 13 to open the 'window/dialog' shown in FIG. 14. In FIG. 14, edit/change the settings for nodes and branches. In FIG. 14, edit the 'branch' labels in the first column 102 shown in FIG. 14. Edit the 'probability' for each branch in the second column 104 shown in FIG. 14. Input the 'reward' for a specific branch, if there is any, in the third column 106 shown in FIG. 14. In FIG. 14, note the 'Inheritance' column 108. In the 'Inheritance' column 108 of FIG. 14, if you select 'Repl.' (meaning replace) or 'Cons.' (meaning consolidation), a 'case' can be selected from the drop-down list in the 'Case' column 110 of FIG. 14, and set a 'factor' in the 'Factor' column 112 for that branch. Use the 'add branch' button 114 or the 'delete branch' button 116 in FIG. 14 to add or delete a branch.

Referring to FIGS. 15, 15A, 15B, 15C, 15D, 16, 16A, 16B, 16C, and 16D, 'sixth and seventh window/dialogs' 78, that are displayed on the 'display device' 50c of the computer system/Decision Tree Generator 50 of FIGS. 5 and 9 in response to execution of the Decision Tree Generation Software 52 by processor 50a, are illustrated.

In FIG. 8, consider the sixth step 72 practiced by the Decision Tree Generator 50 for the purpose of calculating a Decision Tree and displaying 'results', as follows:

(Step 6) Print 'results' in the 'results view' where the 'results' include expected values and joint probability for each node, decision path for decision nodes, and cumulative probability for selected nodes, step 72 of FIG. 8.

Figure 15:
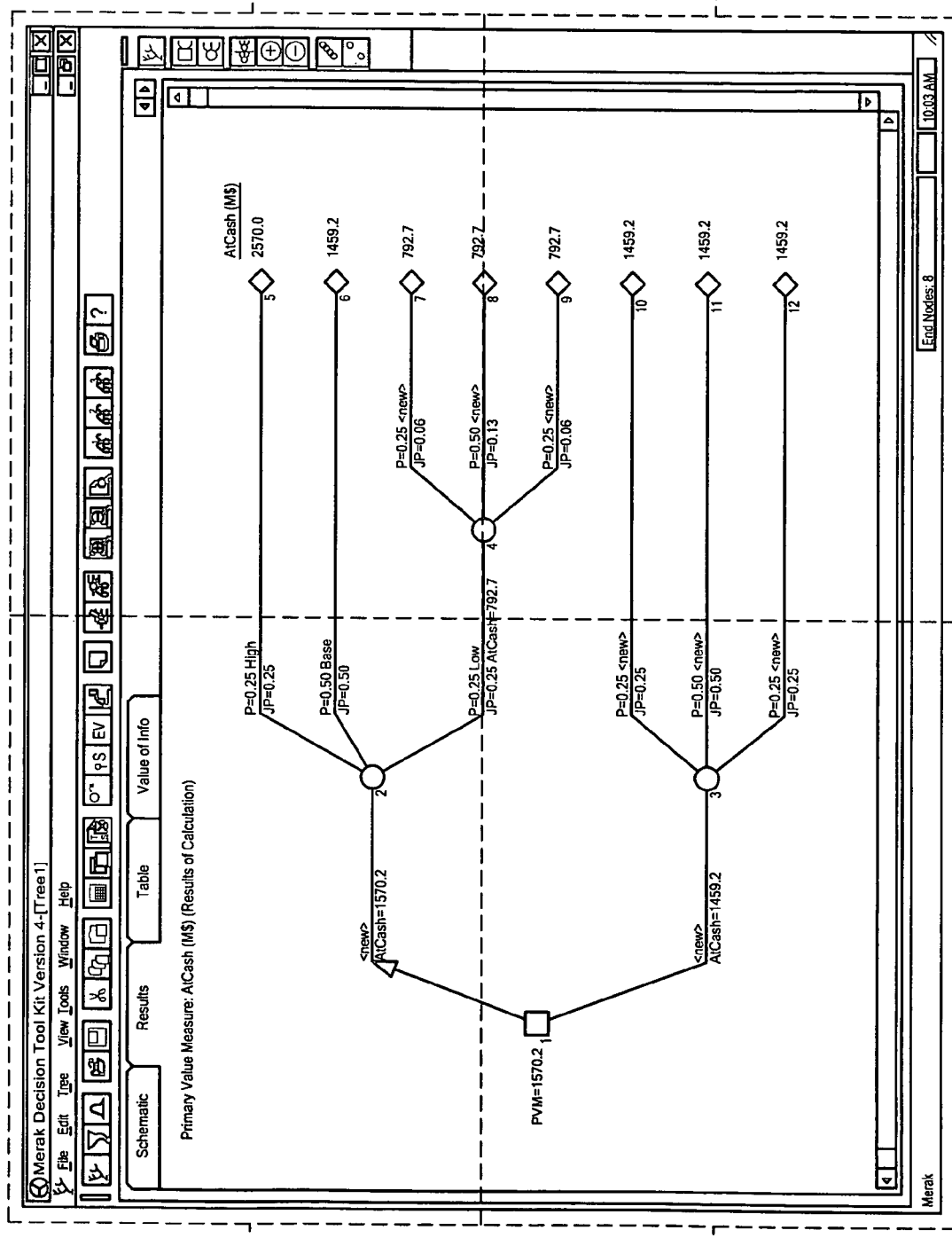
Figure 15A:
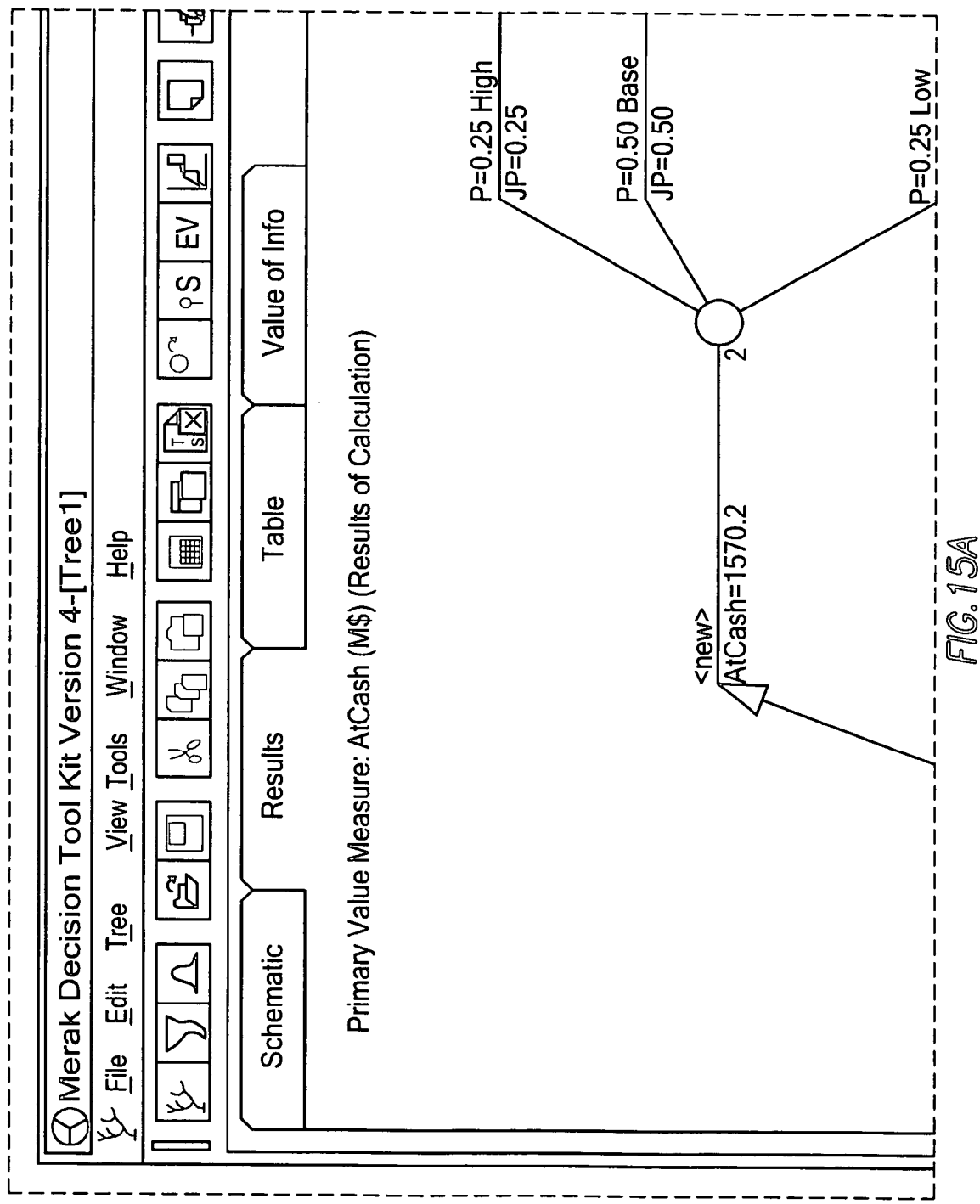
Figure 15B:
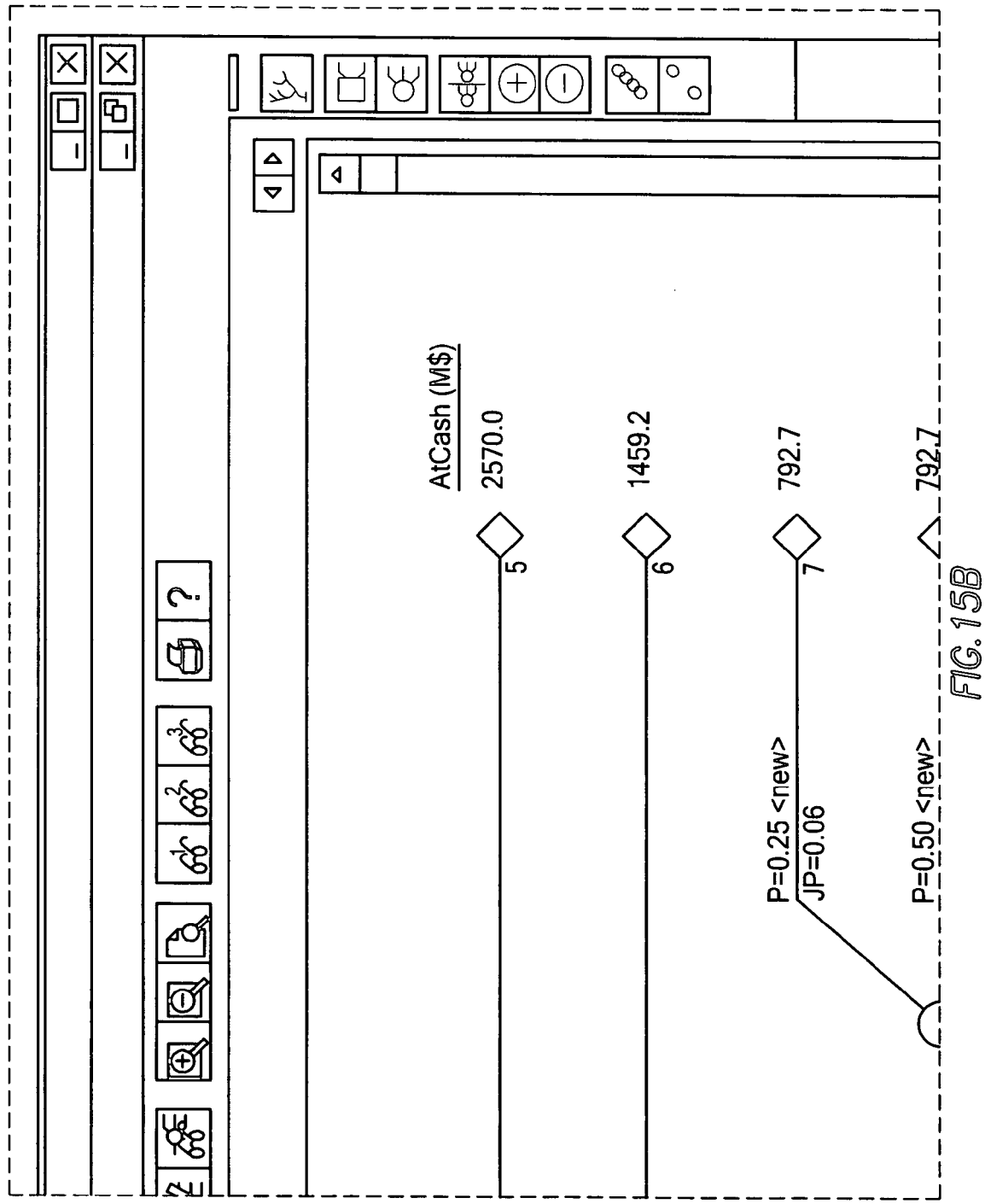
Figure 15C:
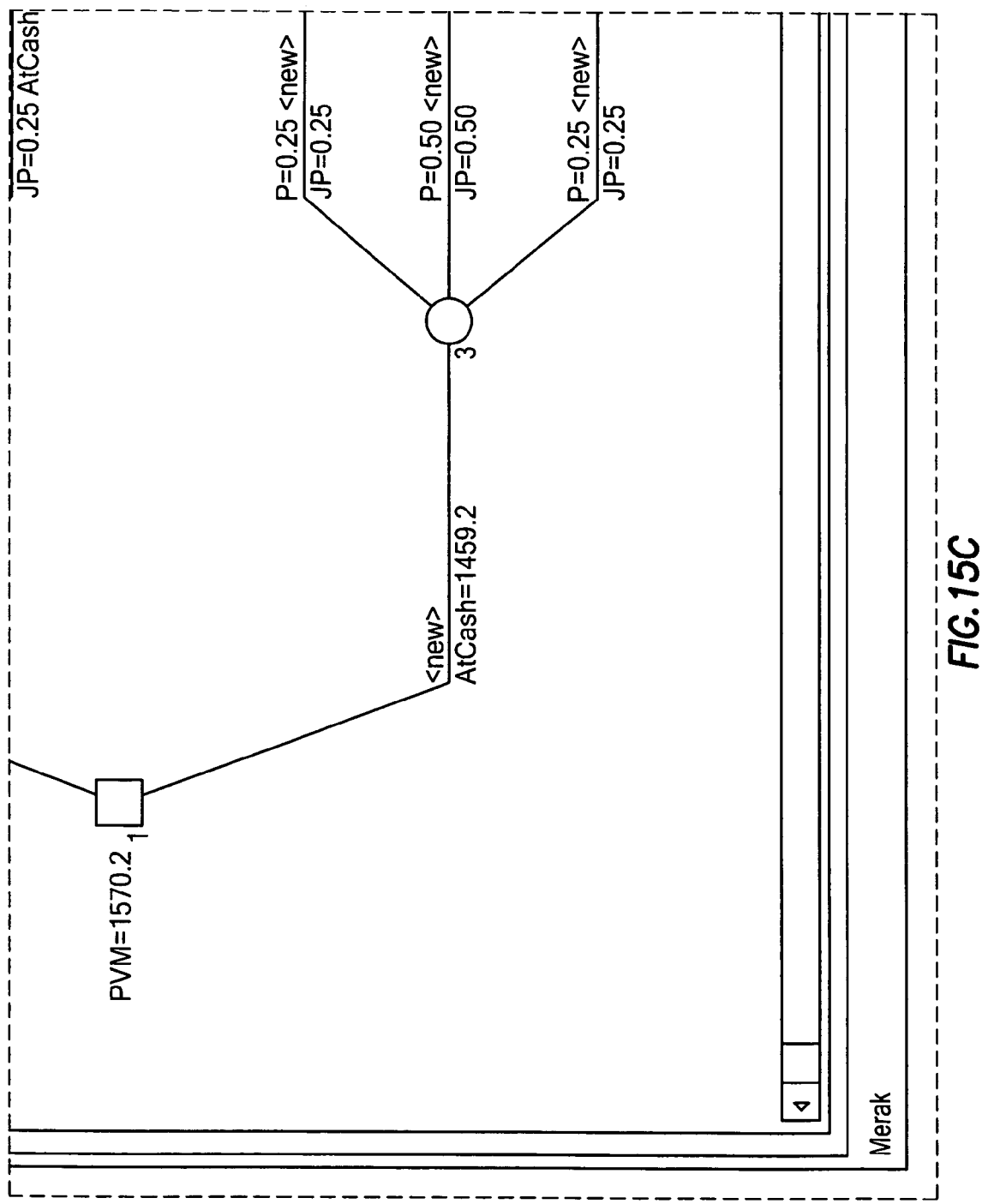

In FIG. 15, after calculating the Decision Tree, the 'Result View' as shown in FIG. 15 is generated. The 'Result View' of FIG. 15 illustrates the expected values for nodes, the decision path (if there is a decision node—the root node in this example), probabilities and joint probabilities for branches, and indicator values for end nodes.

Figure 16:
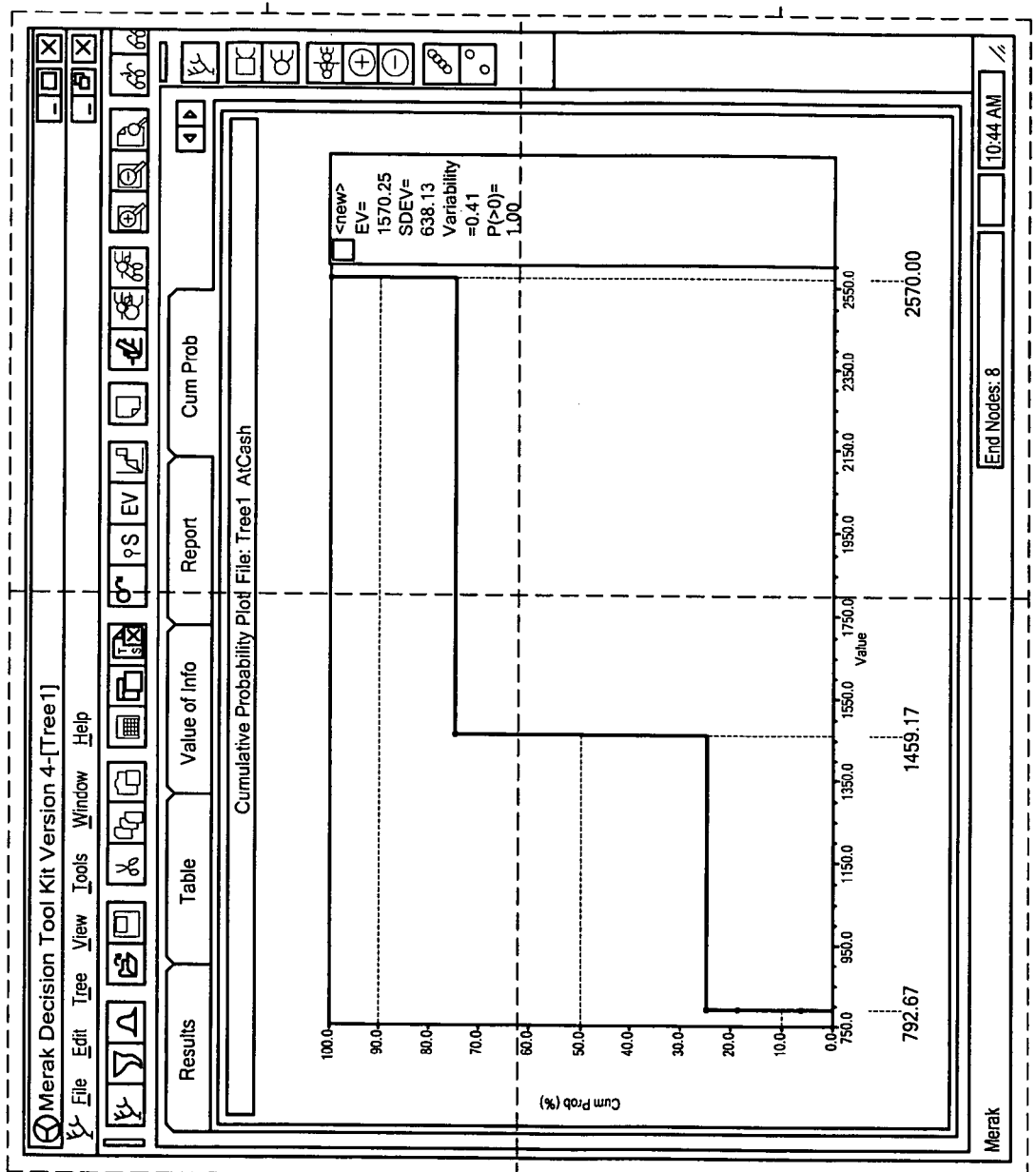
Figure 16A:
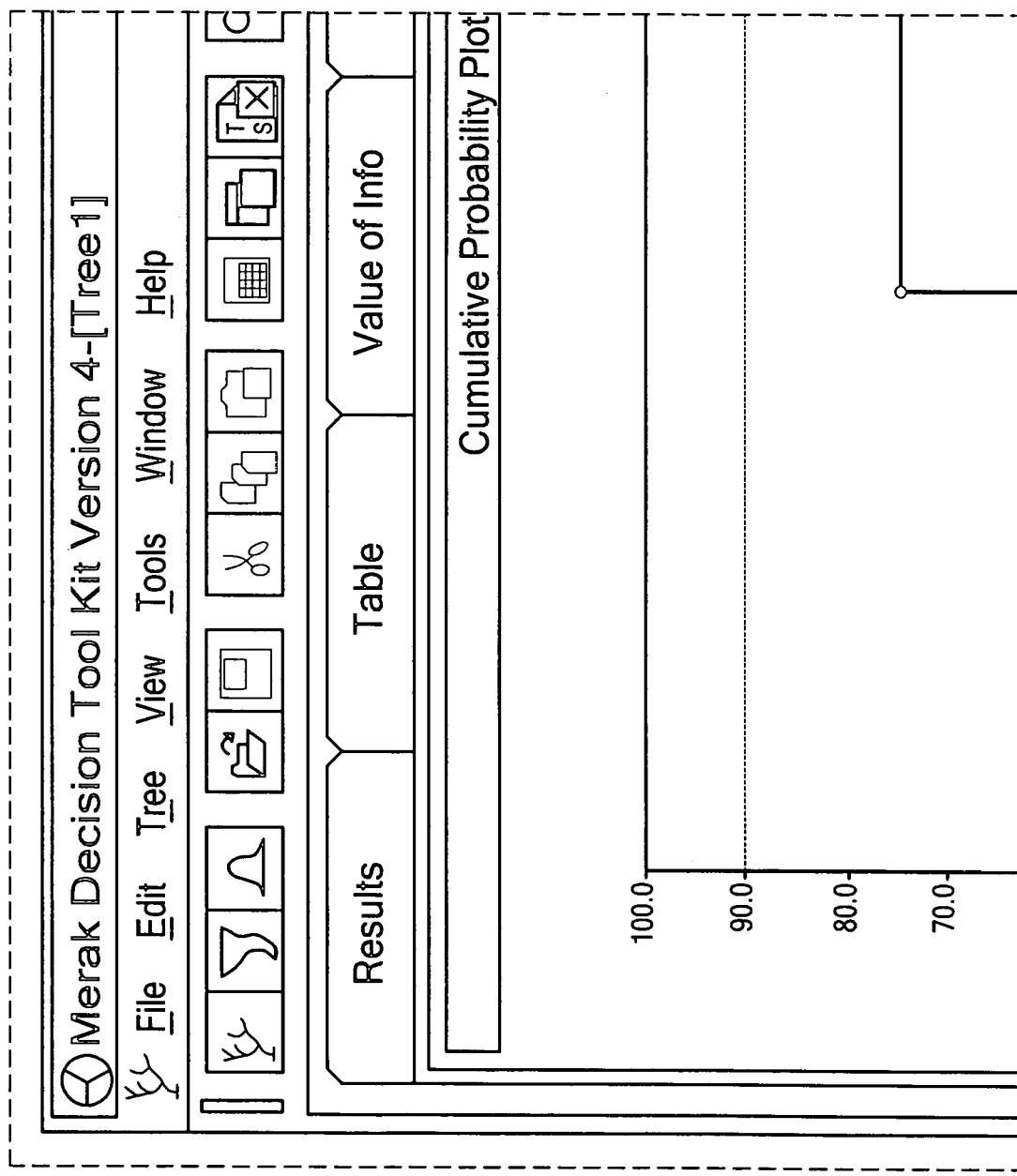
Figure 16B:
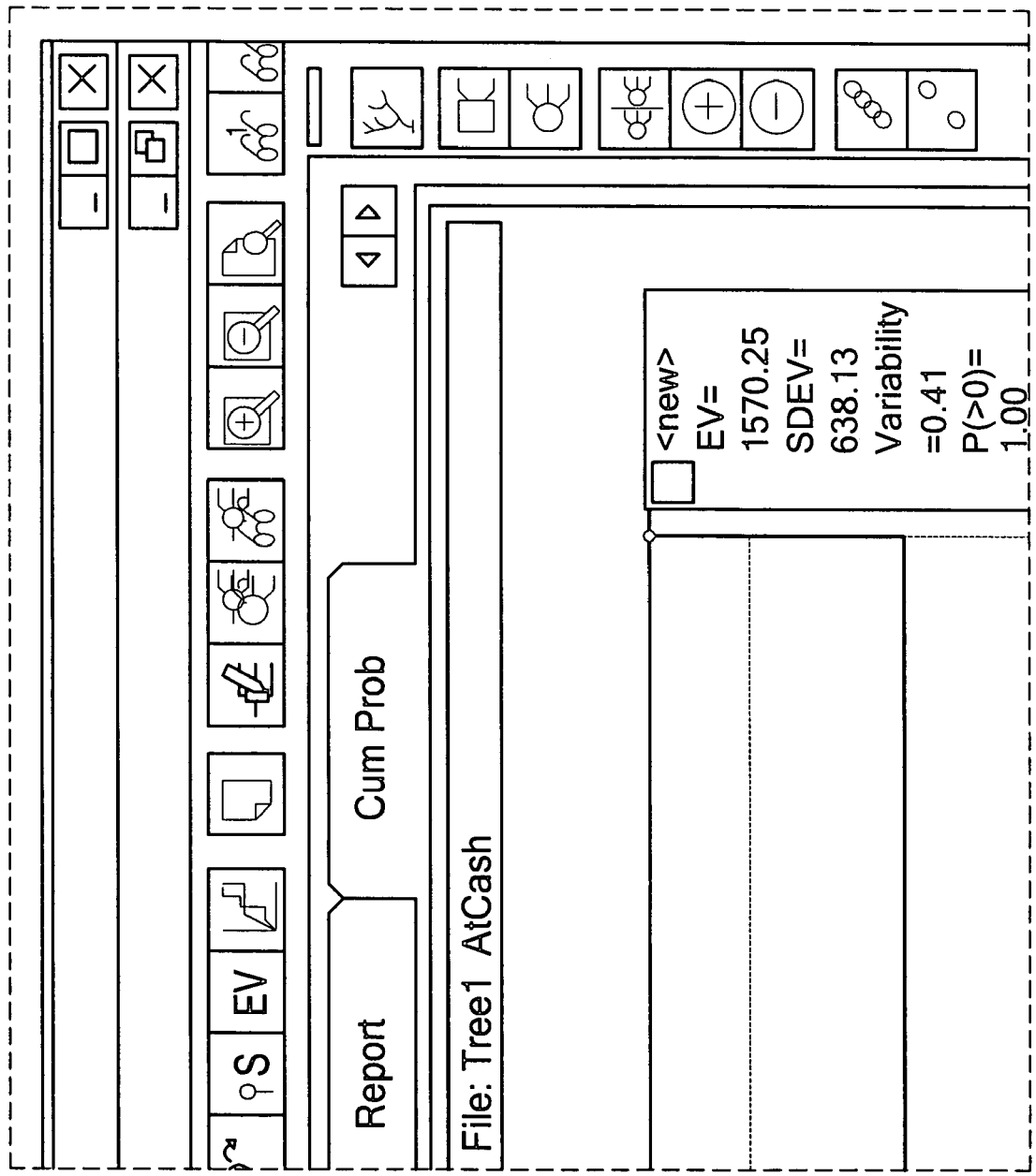
Figure 16C:
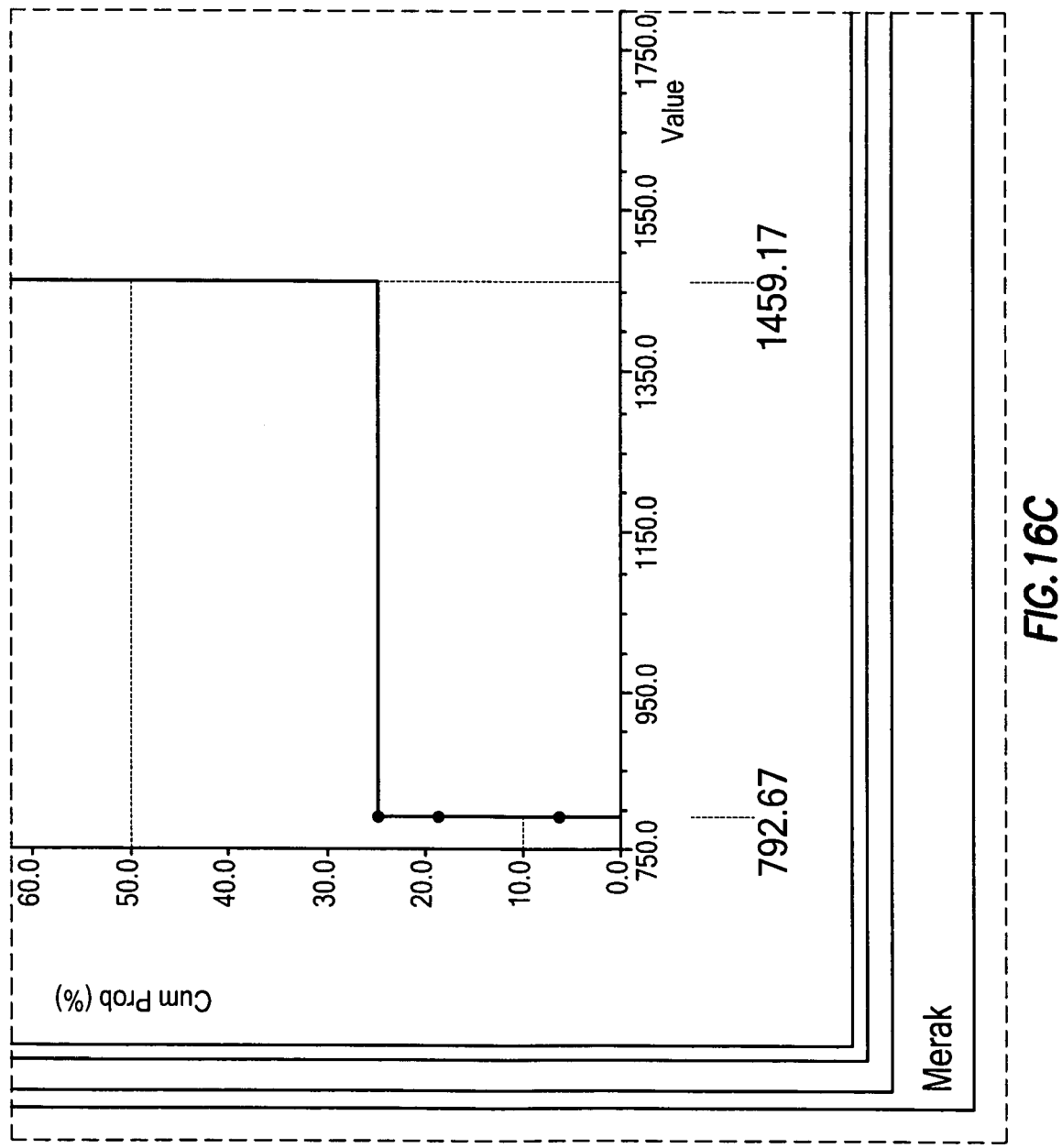
Figure 16D:
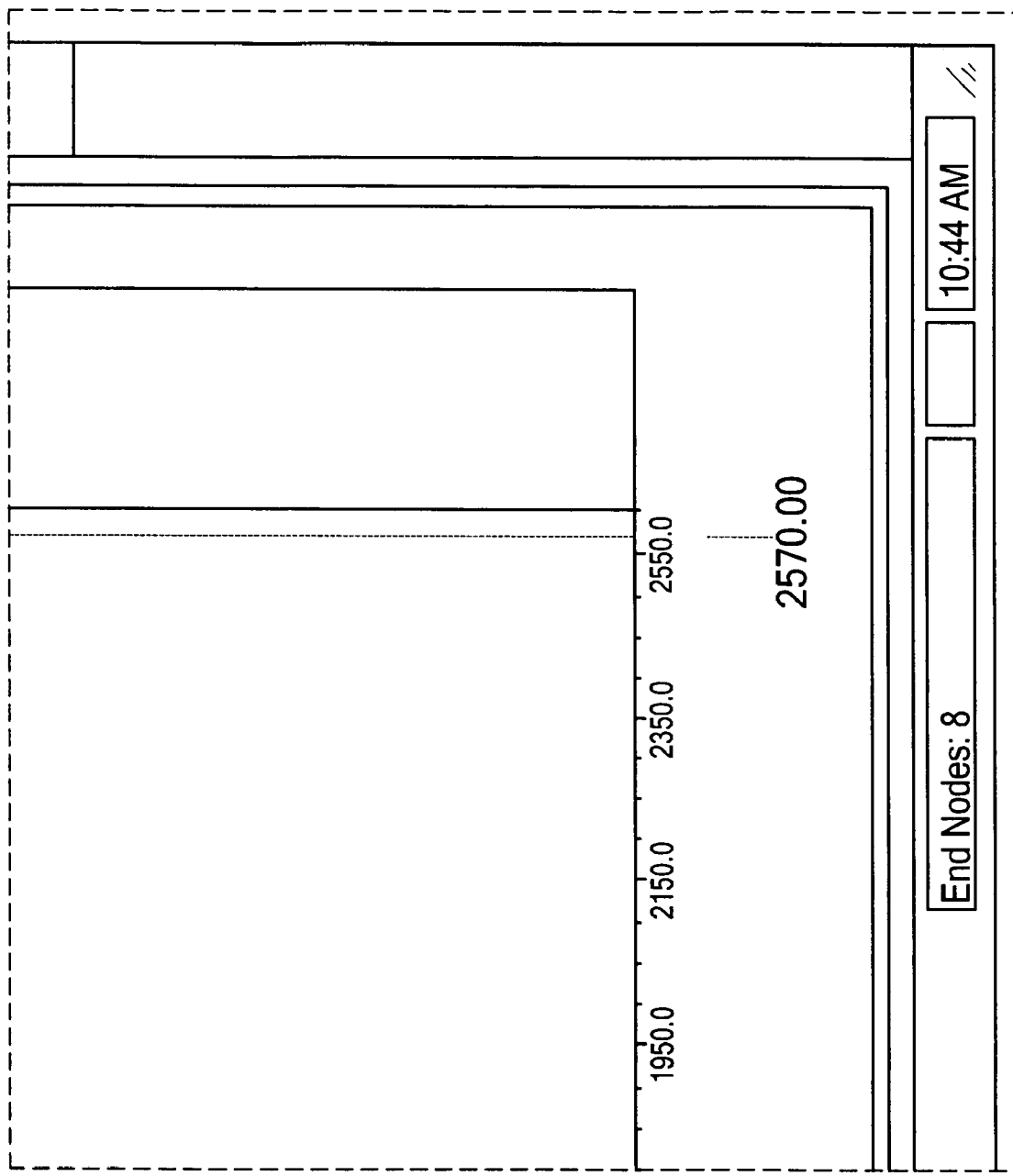

In FIG. 16, select a node in the 'Result View' of FIG. 15 and then perform a 'cumulative probability calculation'. In response to the 'cumulative probability calculation', the window/dialog of FIG. 16 is generated. The window/dialog shown in FIG. 16 illustrates the probability cumulating on various values of the indicator.

Referring to FIGS. 17, 18, 19, and 20, 'eighth, ninth, tenth, and eleventh window/dialogs' 78, that are displayed on the 'display device' 50c of the computer system/Decision Tree Generator 50 of FIGS. 5 and 9 in response to execution of the Decision Tree Generation Software 52 by processor 50a, are illustrated.

Figure 17:
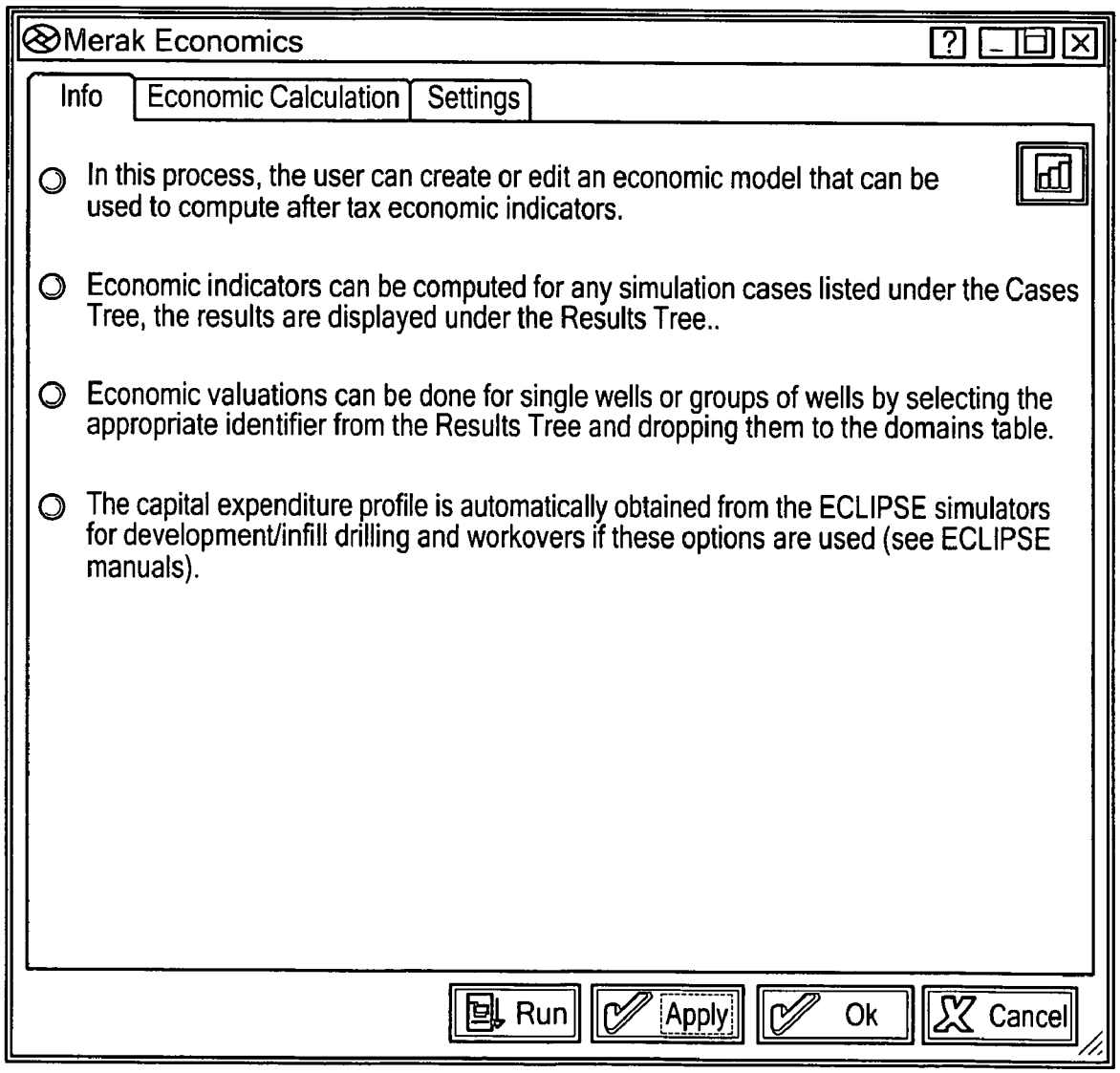
Figure 18:
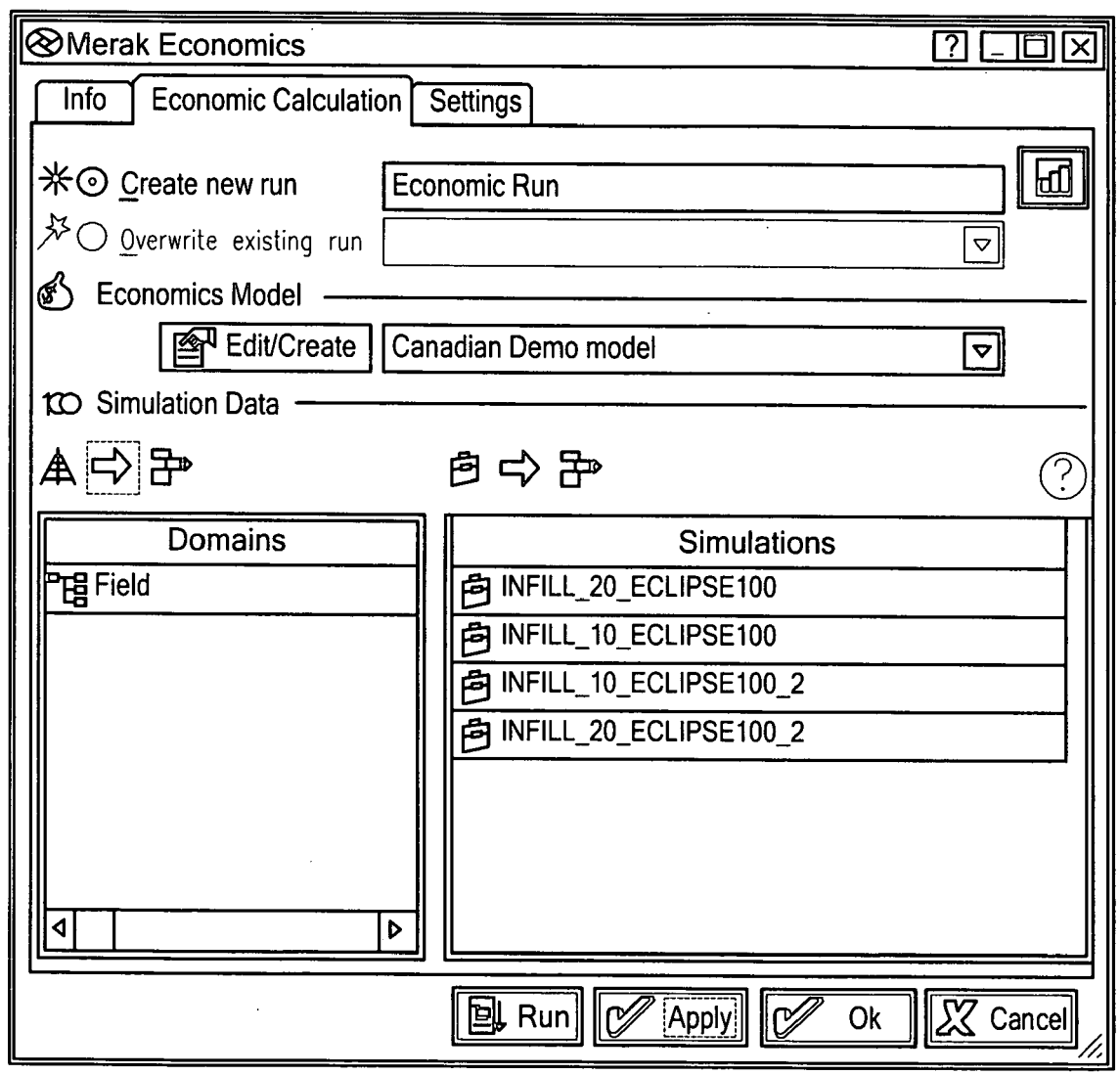
Figure 19:
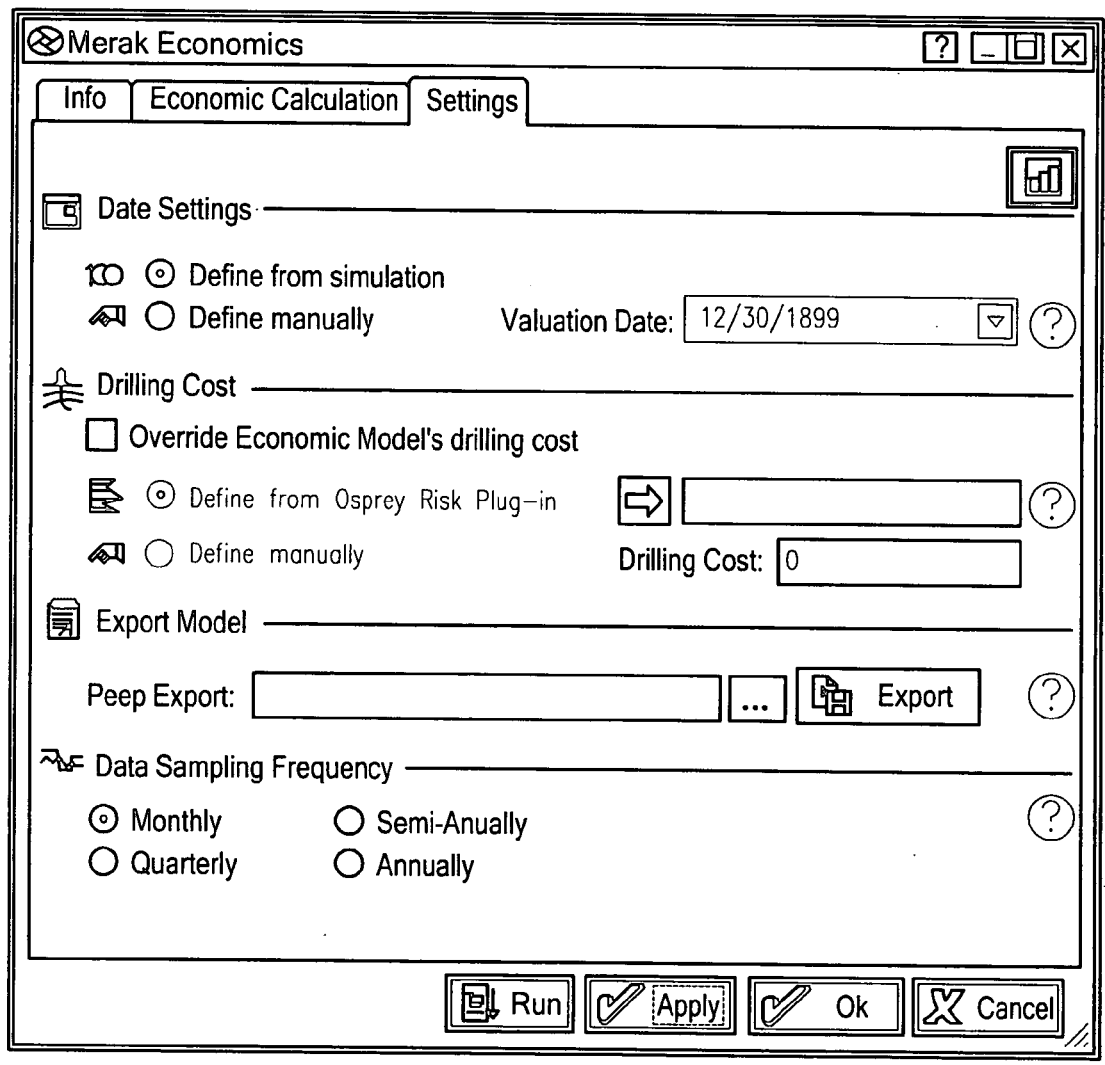

In FIGS. 17 through 19, the 'window/dialogs' shown in FIGS. 17, 18, and 19 represent and illustrate the three main 'Economics process' dialog tabs.

Figure 20:
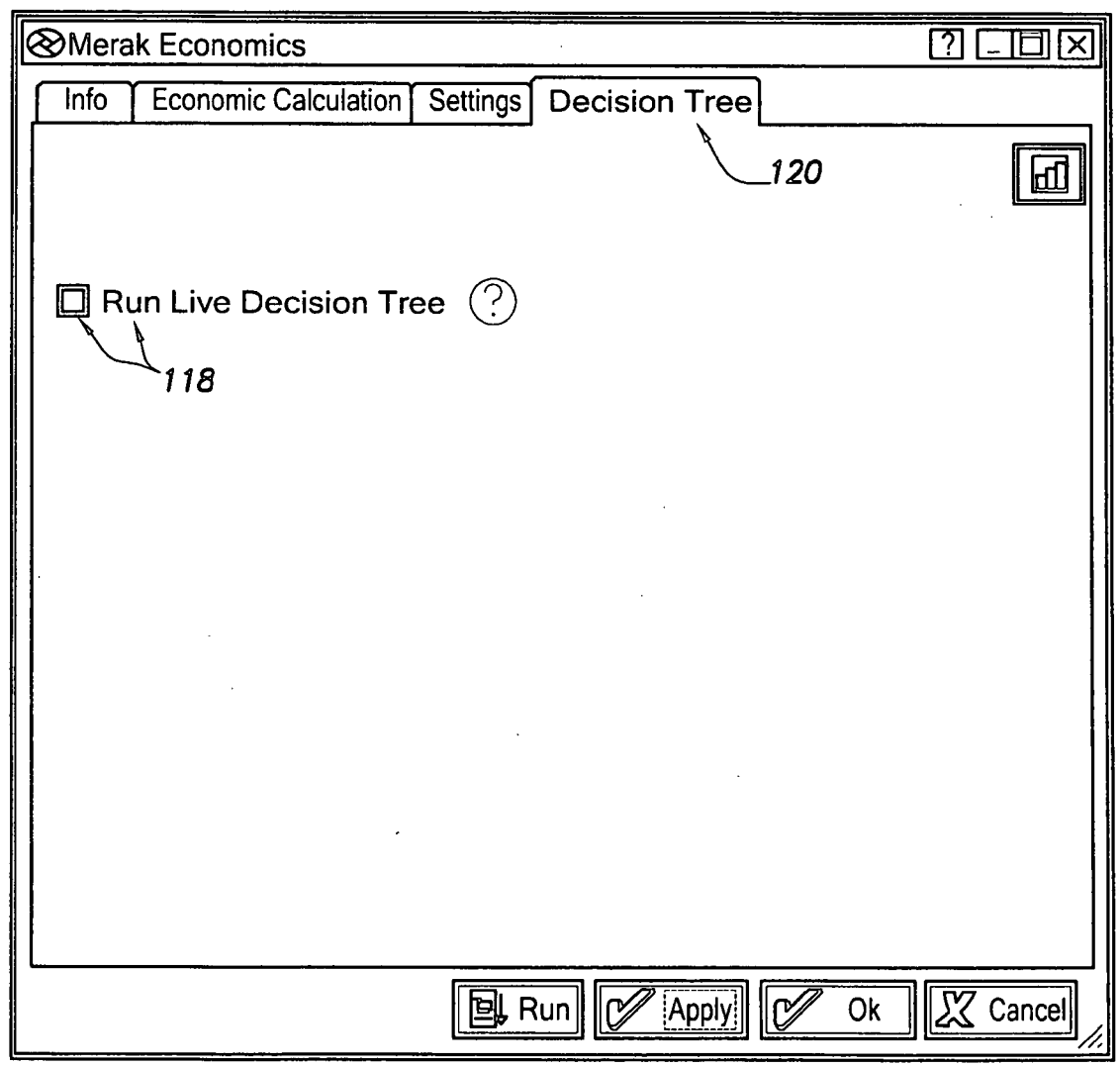

In FIG. 20, an 'additional fourth tab' 120 is illustrated. The 'additional fourth tab' 120 in FIG. 20 includes an extra tick box 118. By using the extra tick box 118, the user can switch 'on' or 'off' the ultimate generation of a 'Live Decision Tree output' after the main economic calculations are run. The user would set up the Economics run (by selecting domains, simulations, and settings); however, by using the extra tick box 118 in FIG. 20, the user can also switch 'on' or switch 'off' the extra tick box 118 on the new dialog tab 120 shown in FIG. 20.

A functional description of the operation of the 'Decision Tree Generation Software' 52 of FIG. 5 will be set forth in the following paragraphs with reference to FIGS. 1 through 20 of the drawings.

In FIGS. 6 and 7, recall from FIG. 1 that the 'seismic simulation workflow' 10 of FIG. 1 actually includes a 'multiple number of workflows' where 'each workflow' of the 'multiple number of workflows' represents a single 'modeling scenario'. The 'modeling scenario generator' 56 in FIGS. 6 and 7 will generate a multiple number of 'modeling scenarios' representing a 'multiple number of workflows' (similar to the workflows 10 shown in FIG. 1) including the following above referenced 'input data': a case list, an indicator list, indicator values, chance factors in addition to the scenarios, relationships, probabilities, and economic indicators. In response to the multiple number of 'modeling scenarios' received from the 'modeling scenario generator' 56, and with the assistance of a user/operator modeler/interpreter, the 'Decision Tree Generator' 50 in FIGS. 6 and 7 will generate a 'Decision Tree display' 58, such as the 'Decision Tree display' 58 shown in FIG. 6 (and also shown in FIGS. 2, 3, and 4).

When the user/operator modeler/interpreter assists with the generation of the 'Decision Tree display' 58 as noted above, the following actions are taken by the user/operator modeler/interpreter.

In FIG. 10, 'Step 1' (step 62 in FIG. 8) is accomplished by selecting 'Petrel' 80 as the calculation engine (numeral 80 in FIG. 10). The calculation engine is a tool used to calculate the 'value measure'. In addition, 'Step 2' (step 64 in FIG. 8) is accomplished by 'selecting a case as the base case' (numeral 82 in FIG. 10), and this is accomplished by 'clicking-on' the 'Document' button 84 in FIG. 10. The 'Document' button 84 will bring up a list of cases which are based on the calculation engine selected. When the base case is selected, the base case will be applied across the entire Decision Tree unless the user defines a new one for a specific branch. In FIG. 11, clicking-on the 'Add' button 86 will bring-up and display a list of indicators set forth in the 'window/dialog' shown in FIG. 12. In FIG. 12, select a 'primary value measure' from the list of indicators 88 shown in FIG. 12. Select a 'secondary value measure' from the list of indicators 88 in FIG. 12. In FIG. 11, the selected 'primary value measure' (selected from FIG. 12) will appear in space 90 shown in FIG. 11. The value of the 'primary value measure' will be used in decision making. The selected 'secondary value measure' (selected from FIG. 12) will appear in space 92 shown in FIG. 11. In FIG. 11, set the decision criteria, which is either 'maximize' or 'minimize' (see numeral 94 in FIG. 11). In FIGS. 13 and 14, a 'Decision Tree' is calculated and constructed which includes adding/deleting nodes and adding/deleting branches. In FIG. 13, note the 'Decision Node' 96, which has a 'square shape'. Here, probabilities for decision nodes cannot be set. The calculation will make a decision for each decision node based on the decision criteria. In FIG. 13, note the 'Uncertainty node' 98, which has a 'circle shape'. Each branch of an uncertainty node 98 is assigned a probability. The expected value of an uncertainty node 98 is calculated based on the branch probabilities and the expected values of corresponding connecting nodes. In FIG. 13, note the 'End node' 100, which has a 'diamond shape'. Hold the original value measure (indicator) values which will be used for roll-back calculation. In FIG. 14, double-click a node 96, 98, 100 in FIG. 13 to open the 'window/dialog' shown in FIG. 14. In FIG. 14, edit/change the settings for nodes and branches. In FIG. 14, edit the 'branch' labels in the first column 102 shown in FIG. 14. Edit the 'probability' for each branch in the second column 104 shown in FIG. 14. Input the 'reward' for a specific branch, if there is any, in the third column 106 shown in FIG. 14. In FIG. 14, note the 'Inheritance' column 108. In the 'Inheritance' column 108 of FIG. 14, if you select 'Repl.' (meaning replace) or 'Cons.' (meaning consolidation), a 'case' can be selected from the drop-down list in the 'Case' column 110 of FIG. 14, and set a 'factor' in the 'Factor' column 112 for that branch. Use the 'add branch' button 114 or the 'delete branch' button 116 in FIG. 14 to add or delete a branch. In FIG. 15, after calculating the Decision Tree, the 'Result View' as shown in FIG. 15 is generated. The 'Result View' of FIG. 15 illustrates the expected values for nodes, the decision path (if there is a decision node—the root node in this example), probabilities and joint probabilities for branches, and indicator values for end nodes. In FIG. 16, select a node in the 'Result View' of FIG. 15 and then perform a 'cumulative probability calculation'. In response to the 'cumulative probability calculation', the diagram of FIG. 16 is generated. The diagram shown in FIG. 16 illustrates the probability cumulating on various values of the indicator.

The above description of the 'Decision Tree Generation software' being thus described, it will be obvious that the same may be varied in many ways. Such variations are not to be regarded as a departure from the spirit and scope of the claimed method or apparatus or program storage device, and all such modifications as would be obvious to one skilled in the art are intended to be included within the scope of the following claims.

We claim:

1. A computerized method of generating a decision tree for a seismic to simulation workflow, comprising:

identifying a plurality of elements of the seismic to simulation workflow; receiving a plurality of modeling scenarios for each of the plurality of elements, wherein plurality of modeling-scenarios are associated with a plurality of realizations of the seismic to simulation workflow;

receiving a plurality of probabilities for the plurality of modeling scenarios;

generating a decision tree comprising a plurality of nodes and a plurality of branches in response to said plurality of modeling scenarios, wherein each level of the decision tree is associated with one of the plurality of elements, wherein the plurality of nodes are associated with the plurality of modeling scenarios, and wherein the plurality of branches are based on the plurality of probabilities;

selecting, from the decision tree, a realization of the plurality of realizations; and running the seismic to simulation workflow based on the realization to eliminate low profitability options of a reservoir.

2. The method of claim 1, wherein generating the decision tree comprises:

selecting an economic engine for calculating a plurality of ecocnomic value measures;

receiving a plurality of economic cases from the economic calculation engine; and mapping the plurality of economic cases to the plurality of modeling scenarios.

3. The method of claim 2, wherein generating the decision tree further comprises:

receiving a plurality of economic indicators from the economic calculation engine;

selecting a primary value measure from the plurality of economic indicators;

selecting a secondary value measure from the plurality of economic indicators; and selecting a case as a base case in accordance with the selected economic calculation engine.

4. The method of claim 3, wherein generating the decision tree further comprises:

setting a set of decision criteria, said decision tree being calculated and generated in response to the setting step on the condition that the economic calculation engine and said case and said primary value measure and said secondary value measure is selected.

5. A program storage device readable by a machine tangibly embodying a program of instructions executable by the machine to perform method steps for generating a decision tree for a seismic to simulation workflow, said method steps comprising:

identifying a plurality of elements of the seismic to simulation workflow;

receiving a plurality of modeling scenarios for each of the plurality of elements, wherein the plurality of modeling scenarios are associated with a plurality of realizations of the seismic to simulation workflow;

receiving a plurality of probabilities for the plurality of modeling scenarios;

generating a decision tree comprising a plurality of nodes and a plurality of branches in response to said plurality of modeling scenarios, wherein each level of the decision tree is associated with one of the plurality of elements, wherein the plurality of nodes are associated with the plurality of modeling scenarios, and wherein the plurality of branches are based on the plurality of probabilities;

selecting, from the decision tree, a realization of the plurality of realizations; and running the seismic to simulation workflow based on the realization to eliminate low profitability options of a reservoir.

6. The program storage device of claim 5, wherein generating a decision tree comprises:

selecting an economic calculation engine for calculating a plurality of economic value measures;

receiving a plurality of economic cases from the economic calculation engine; and mapping the plurality of economic cases to the plurality of modeling scenarios.

7. The program storage device of claim 6, wherein generating a decision tree further comprises:

receiving a plurality of economic indicators from the economic calculation engine;

selecting a primary value measure from the plurality of economic indicators;

selecting a secondary value measure from the plurality of economic indicators; and selecting a case as a base case in accordance with the selected economic calculation engine.

8. The program storage device of claim 7, wherein generating the decision tree further comprises:

setting a set of decision criteria, said decision tree being calculated and generated in response to the setting step.

9. A system for generating a decision tree for a seismic to simulation workflow, comprising:

first apparatus for identifying a plurality of elements of the seismic to simulation workflow, for receiving a plurality of modeling scenarios for each of the plurality of elements, wherein the plurality of modeling scenarios are associated with a plurality of realizations of the seismic to simulation workflow, and for receiving a plurality of probabilities for the plurality of modeling scenarios; and second apparatus for generating a decision tree comprising a plurality of nodes and a plurality of branches in response to said plurality of modeling scenarios, wherein each level of the decision tree is associated with one of the plurality of elements, wherein the plurality of nodes are associated with the plurality of modeling scenarios, and wherein the plurality of branches are based on the plurality of probabilities;

third apparatus for selecting from the decision tree, a realization of the plurality of realizations; and fourth apparatus for running the seismic to simulation workflow based on the realization to eliminate low profitability options of a reservoir.

10. The system of claim 9, wherein the second apparatus for generating a decision tree comprises:

apparatus for selecting an economic calculation engine for calculating a plurality of economic value measures;

apparatus for receiving a plurality of economic cases from the economic calculation engine; and apparatus for mapping the plurality of economic cases to the plurality of modeling scenarios.

11. The system of claim 10, wherein the second apparatus for generating a decision tree further comprises:

apparatus for receiving a plurality of economic indicators from the economic calculation engine;

apparatus for selecting a primary value measure from the plurality of economic indicators;

apparatus for selecting a secondary value measure from the plurality of economic indicators; and apparatus for selecting a case as a base case in accordance with the selected economic calculation engine.

12. The system of claim 11, wherein the second apparatus adapted for generating a decision tree further comprises:

apparatus adapted for setting a set of decision criteria, said decision tree being calculated and generated in response to said setting a set of decision criteria.

13. A computer program to be executed by a processor, said computer program, when executed by said processor, conducting a process for generating a decision tree, said process comprising:

identifying a plurality of elements of the seismic to simulation workflow;

receiving a plurality of modeling scenarios for each of the plurality of elements, wherein the plurality of modeling scenarios are associated with a plurality of realizations of the seismic to simulation workflow;
realizations of the seismic to simulation workflow;
receiving a plurality of probabilities for the plurality of modeling scenarios;
generating a decision tree comprising a plurality of nodes and a plurality of branches in response to said plurality of modeling scenarios, wherein each level of the decision tree is associated with one of the plurality of elements, wherein the plurality of nodes are associated with the plurality of modeling scenarios, and wherein the plurality of branches are based on the plurality of probabilities;
selecting from the decision tree, a realization of the plurality of realizations; and
running the seismic to simulation workflow based on the realization to eliminate low profitability options of a reservoir.

14. The computer program of claim 13, wherein generating the decision tree comprises:
selecting an economic calculation engine for calculating a plurality of economic value measures;
receiving a plurality of economic cases from the economic calculation engine; and
mapping the plurality of economic cases to the plurality of modeling scenarios.

15. The computer program of claim 14, wherein generating the decision tree further comprises:
receiving a plurality of economic indicators from the economic calculation engine;
selecting a primary value measure from the plurality of economic indicators;
selecting a secondary value measure from the plurality of economic indicators; and
selecting a case as a base case in accordance with the selected economic calculation engine.

16. The computer program of claim 15, wherein generating the decision tree further comprises:
setting a set of decision criteria, said decision tree being calculated and generated in response to the setting step.

17. The method of claim 1, wherein at least one of the plurality of elements is selected from a group consisting of flow simulations, wells, and three-dimensional grids.

18. The program storage device of claim 5, wherein at least one of the plurality of elements is selected from a group consisting of flow simulations, wells, and three-dimensional grids.

19. The system of claim 9, wherein at least one of the plurality of elements is selected from a group consisting of flow simulations, wells, and three-dimensional grids.

20. The computer program of claim 13, wherein at least one of the plurality of elements is selected from a group consisting of flow simulations, wells, and three-dimensional grids.

* * * * *